(12) United States Patent
Alstad et al.

(10) Patent No.: US 11,773,807 B1
(45) Date of Patent: Oct. 3, 2023

(54) ACTUATOR SYSTEMS FOR THRUST REVERSER

(71) Applicant: HONEYWELL INTERNATIONAL INC., Charlotte, NC (US)

(72) Inventors: Shawn Alstad, Phoenix, AZ (US); Laurence Liston, Phoenix, AZ (US); Andrew Appleby, Phoenix, AZ (US); Jeffrey Aitchison, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/662,684

(22) Filed: May 10, 2022

(51) Int. Cl.
*F02K 1/76* (2006.01)
*F16H 25/22* (2006.01)
*F16H 25/24* (2006.01)

(52) U.S. Cl.
CPC .............. *F02K 1/763* (2013.01); *F02K 1/766* (2013.01); *F16H 25/2204* (2013.01); *F16H 25/2454* (2013.01); *F05D 2220/323* (2013.01); *F05D 2260/403* (2013.01); *F05D 2270/66* (2013.01)

(58) Field of Classification Search
CPC ...... F02K 1/763; F02K 1/766; F16H 25/2204; F16H 25/2454; F05D 2270/64–66; F04C 2/102; F04C 2/103
See application file for complete search history.

(56) References Cited

U.S. PATENT DOCUMENTS

| | | | |
|---|---|---|---|
| 4,597,476 A * | 7/1986 | Wenker | F04C 15/0061 418/61.3 |
| 5,735,557 A | 4/1998 | Harvey | |
| 2003/0066284 A1 | 4/2003 | Chakkera et al. | |
| 2019/0003562 A1* | 1/2019 | Hawksworth | F02K 1/763 |
| 2019/0101208 A1 | 4/2019 | Morgan et al. | |
| 2022/0003187 A1 | 1/2022 | Demichele et al. | |

FOREIGN PATENT DOCUMENTS

| | | |
|---|---|---|
| CN | 1843736 A | 10/2006 |
| CN | 204057523 U | 12/2014 |
| CN | 205521541 U | 8/2016 |
| CN | 109626118 B | 10/2020 |
| CN | 214617720 U | 11/2021 |
| EP | 694120 B1 | 5/2001 |

* cited by examiner

*Primary Examiner* — Andrew H Nguyen
(74) *Attorney, Agent, or Firm* — Lorenz & Kopf LLP

(57) ABSTRACT

An actuator for a thrust reverser includes a ball screw, a ball nut coupled to the ball screw, and a gerotor coupled to the ball screw. The gerotor includes an inner rotor coupled to the ball screw and an outer rotor. The outer rotor includes a plurality of bores. The actuator includes a lock system coupled to the outer rotor. The lock system is to enable the gerotor to rotate the ball screw in an unlocked state and to inhibit a rotation of the ball screw in a lock state. The lock system includes a piston coupled to a piston housing and a grippable member coupled to the piston housing. The piston is received in one of the bores in the lock state, and the grippable member is to move the piston housing relative to the gerotor to move the lock system to the unlocked state.

20 Claims, 15 Drawing Sheets

ACTUATOR SYSTEMS FOR THRUST REVERSER

TECHNICAL FIELD

The present disclosure generally relates to actuators and actuator systems, and more particularly relates to actuators and actuator systems for a thrust reverser.

BACKGROUND

Gas turbine engines may be employed to power various devices. For example, a gas turbine engine may be employed to propel or supply power to a vehicle, such as an aircraft. In some examples, the gas turbine engine may include a thrust reverser, which is deployable to move relative to the gas turbine engine to redirect turbine engine exhaust flow in order to generate reverse thrust to assist in stopping the aircraft. In certain instances, multiple flexible shafts or flexshafts may be driven to move the thrust reverser relative to the gas turbine engine. The use of multiple flexshafts, however, also requires the use of an additional motor to drive the flexshafts, which is mounted remotely from the thrust reverser. The additional motor increases a weight associated with the thrust reverser. The additional motor also increases an amount of space required around the thrust reverser for the mounting of the additional motor.

Accordingly, it is desirable to provide actuators and an actuator system for a thrust reverser, which eliminates the use of an additional motor and thereby reduces a weight of the thrust reverser. In addition, it is desirable to provide actuators and an actuator system that reduces an amount of space required for the actuator system. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is an actuator for a thrust reverser. The actuator includes a ball screw configured to be coupled to the thrust reverser, and a ball nut coupled to the ball screw. The actuator includes a gerotor coupled to the ball screw. The gerotor includes an inner rotor coupled to the ball screw and an outer rotor. A movement of the inner rotor relative to the outer rotor is configured to rotate the ball screw relative to the ball nut to move the thrust reverser between at least a first position and a second position. The outer rotor includes a plurality of bores spaced apart about a perimeter of the outer rotor. The actuator includes a lock system coupled to the outer rotor and movable between an unlocked state and a lock state. The lock system is configured to enable the gerotor to rotate the ball screw in the unlocked state and to inhibit a rotation of the ball screw in the lock state. The lock system includes a piston coupled to a piston housing and a grippable member coupled to the piston housing. The piston is received in one of the plurality of bores of the outer rotor in the lock state, and the grippable member is configured to move the piston housing relative to the gerotor to move the lock system to the unlocked state.

The actuator includes a gerotor housing, the gerotor is disposed within the gerotor housing and the gerotor housing includes a lock receiving bore. The lock system includes a trunnion, and the trunnion is coupled to the lock receiving bore and the piston housing. The trunnion defines a central trunnion bore that receives the piston housing, the central trunnion bore defines a trunnion key slot, the piston housing defines a housing key slot, and the trunnion key slot and the housing key slot cooperate to receive a key to inhibit a rotation of the piston housing relative to the trunnion. The piston housing defines a detent groove along an exterior surface of the piston housing, and the grippable member includes a detent pin that is received within the detent groove. The piston housing includes a piston spring and a fitting, the piston includes a head and a shaft, the shaft is configured to engage the one of the plurality of bores of the outer rotor and the piston spring is disposed between the head and the fitting to bias the piston into engagement with the one of the plurality of bores of the outer rotor. The plurality of bores of the outer rotor includes a pair of overstow bores, which have a dimension that is different than a remainder of the plurality of bores. The actuator includes an extension shaft coupled to the ball nut and configured to be coupled to the thrust reverser, the ball screw is received within the extension shaft, and the rotation of the ball screw is configured to translate the ball nut to move the extension shaft. An end of the actuator opposite the gerotor includes a coupling portion coupled to the extension shaft with a pin and an attachment portion, and the coupling portion and the attachment portion are configured to couple the actuator to the thrust reverser. An end of the actuator opposite the gerotor includes a coupling portion and an attachment portion, the coupling portion coupled to the extension shaft with a connecting shaft, and the coupling portion and the attachment portion are configured to couple the actuator to the thrust reverser. The actuator includes a bevel gear set coupled to at least one of the ball screw and the inner rotor for rotation with the ball screw in the unlocked state. The actuator includes a second actuator configured to be coupled to the thrust reverser, a flex shaft coupled to the bevel gear set and the second actuator, and the flex shaft is configured to be driven by the bevel gear set to drive the second actuator.

Also provided is an actuator system for a thrust reverser. The actuator system includes a source of a fluid, and a lock system. The lock system is in fluid communication with the source of the fluid and movable between an unlocked state and a lock state. The lock system includes a piston coupled to a piston housing and a grippable member coupled to the piston housing. The piston is movable based on a pressure of the fluid to move the lock system between the unlocked state and the lock state, and the grippable member is configured to move the piston housing relative to a gerotor to move the lock system to the unlocked state. The actuator system includes an actuator including a ball screw configured to be coupled to the thrust reverser and the gerotor having an inner rotor and an outer rotor. The outer rotor includes at least one bore configured to receive the piston in the lock state. The ball screw is coupled to the inner rotor and to a ball nut, and the gerotor is configured to rotate the ball screw relative to the ball nut to move the thrust reverser between at least a first position and a second position in the unlocked state.

The actuator system includes a bevel gear set coupled to at least one of the ball screw and the inner rotor for rotation with the ball screw in the unlocked state. The actuator system includes a second actuator configured to be coupled to the thrust reverser, a flex shaft coupled to the bevel gear set and the second actuator, and the flex shaft is configured to be driven by the bevel gear set to drive the second actuator. The gerotor is in fluid communication with the source of the fluid and is responsive to the fluid to rotate the ball screw relative to the ball nut in the unlocked state. The actuator system includes a second actuator configured to be coupled to the thrust reverser, the actuator having a first port and a second port, the second actuator having a third port and a fourth port, the first port and the fourth port in selective fluid communication with the source of the fluid and the second port is fluidly coupled to the third port such that the fluid received to the first port is configured to flow to the second actuator or the fluid received to the fourth port is configured to flow to the second port of the actuator. The piston housing defines a detent groove along an exterior surface of the piston housing, and the grippable member includes a detent pin that is received within the detent groove. The at least one bore of the outer rotor comprises a plurality of bores, and the plurality of bores includes a pair of overstow bores that have a dimension that is different than a remainder of the plurality of bores. The actuator system includes a gerotor housing, the gerotor is disposed within the gerotor housing. The gerotor housing includes a lock receiving bore, and the lock system includes a trunnion coupled to the lock receiving bore and the piston housing. The trunnion defines a central trunnion bore that receives the piston housing, and the central trunnion bore defines a trunnion key slot. The piston housing defines a housing key slot, and the trunnion key slot and the housing key slot cooperate to receive a key to inhibit a rotation of the piston housing relative to the trunnion.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
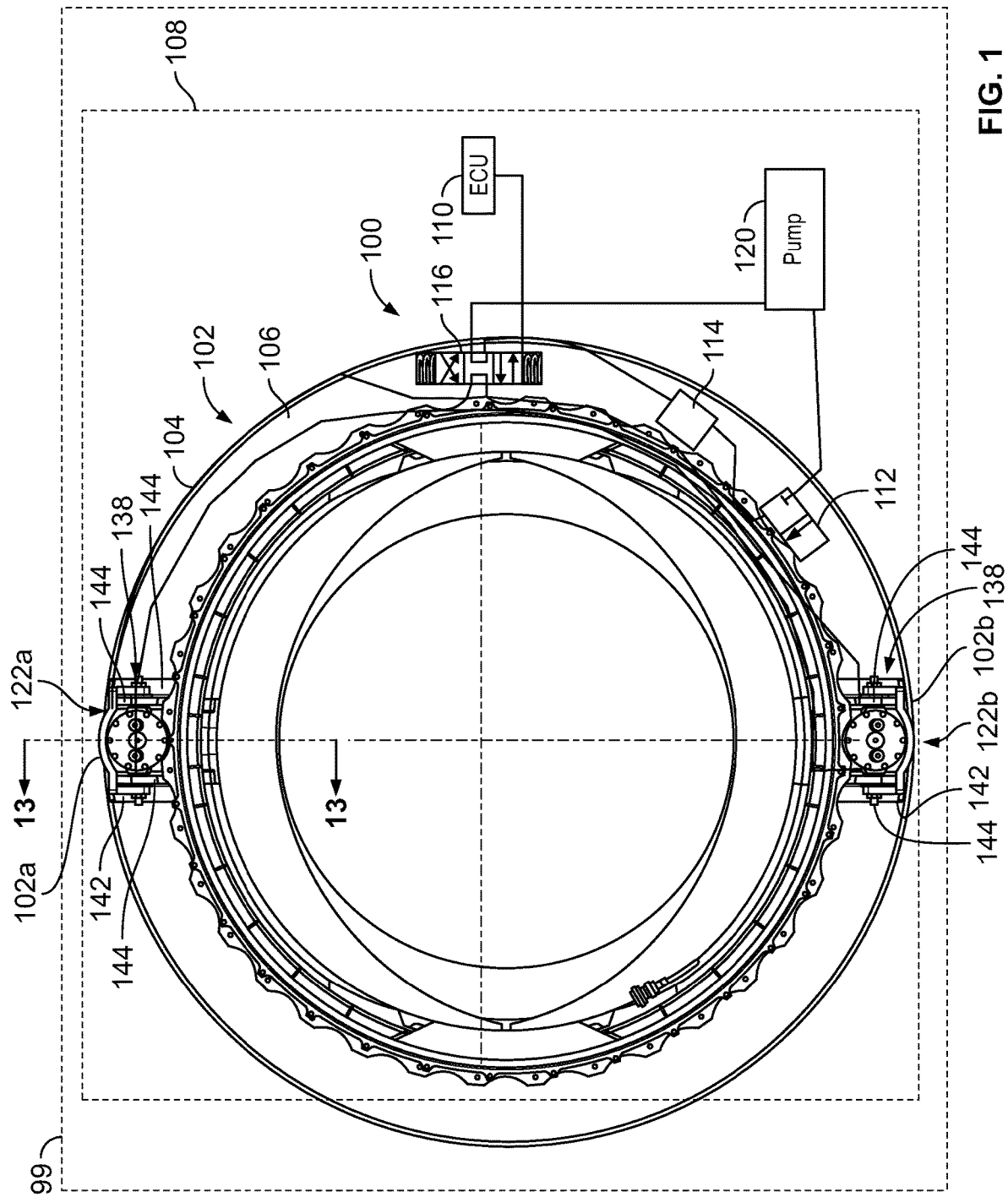
FIG. 1 is a schematic illustration of an actuator system for a thrust reverser in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of device that would benefit from actuators or an actuator system, and the use of the actuators and actuator system for a thrust reverser of a gas turbine engine associated with a vehicle described herein is merely one exemplary embodiment according to the present disclosure. In addition, while the actuator system is described herein as being used with a gas turbine engine onboard a vehicle, such as a bus, motorcycle, train, automobile, marine vessel, aircraft, rotorcraft and the like, the various teachings of the present disclosure can be used with a gas turbine engine in other applications. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

Figure 2:
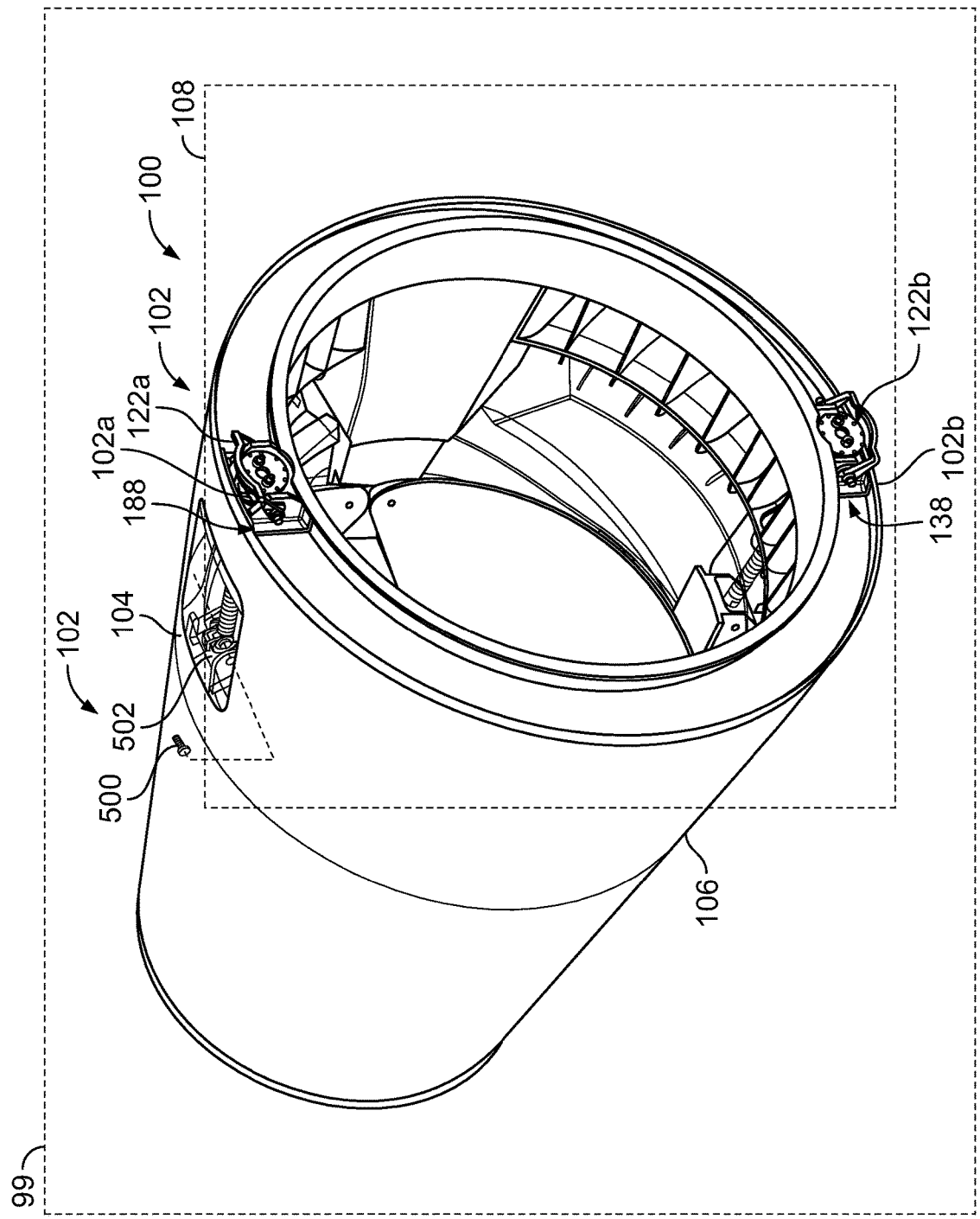
FIG. 2 is a perspective view of a portion of the actuator system coupled to the thrust reverser in accordance with various embodiments.

With reference to FIGS. 1 and 2, an actuator system 100 is shown. In one example, the actuator system 100 is used to deploy a thrust reverser 102 associated with a vehicle 99, such as an aircraft. In this example, the thrust reverser 102 includes a translating cowl 104, which is movable relative to a frame 106 of the thrust reverser 102. As the thrust reverser 102 is generally known, the thrust reverser 102 will not be discussed in detail herein. Briefly, the translating cowl 104 is movable by the actuator system 100 between a first, deployed position in which the thrust reverser 102 is open to generate reverse thrust; a second, stowed position in which the thrust reverser 102 is closed; and a third, overstowed position in which the translating cowl 104 is advanced forward beyond the second, stowed position. Thus, the thrust reverser 102 is movable by the actuator system 100 between the first, deployed position, the second, stowed position and the third, overstowed position relative to a gas turbine engine 108 associated with the vehicle 99. It should be noted that while the thrust reverser 102 is described and illustrated herein as including the translating cowl 104 for use with the actuator system 100, the actuator system 100 may be employed with any suitable thrust reverser for use with the vehicle 99.

Figure 3:
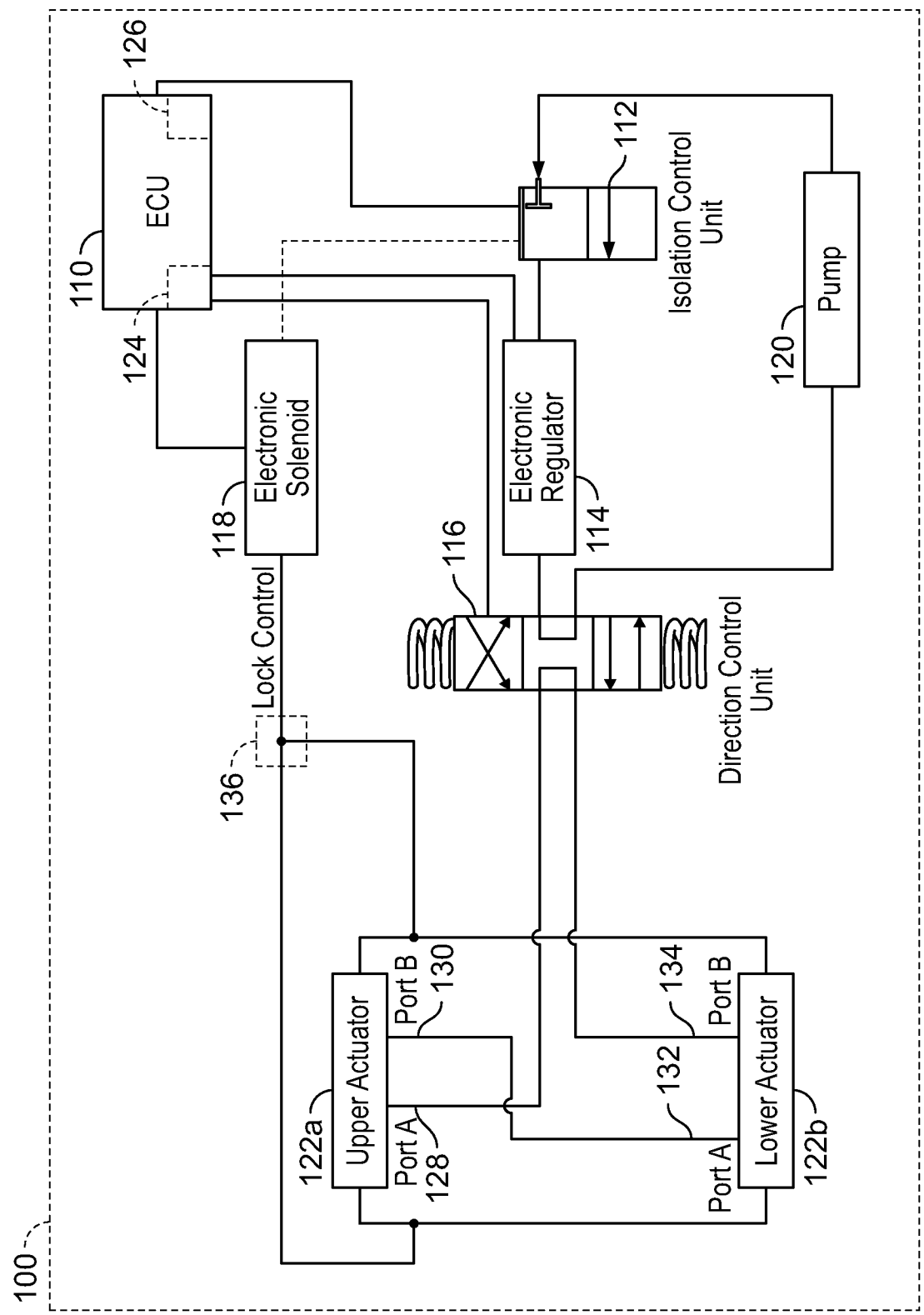
FIG. 3 is a functional block diagram of the actuator system of FIG. 1.

With additional reference to FIG. 3, a schematic diagram of the actuator system 100 is shown. In one example, the actuator system 100 includes a controller 110, an isolation control unit 112, a regulator 114, a direction control unit 116, a solenoid 118, a pump 120 and at least one actuator 122. In this example, the actuator system 100 includes two actuators 122, with one actuator 122a mounted at a first end or upper end 102a of the thrust reverser 102, and one actuator 122b mounted at a second end or lower end 102b of the thrust reverser 102, with the upper end 102a opposite the lower end 102b.

The controller 110 is in communication with the isolation control unit 112, the regulator 114, the direction control unit 116 and the solenoid 118 over a suitable communication architecture that supports the transfer of data, commands, power, etc., including, but not limited to a bus. The controller 110 is also in communication with a source of input, such as a human-machine interface associated with the vehicle 99 (FIG. 1). The controller 110 includes at least one processor 124 and a computer readable storage device or media 126. The processor 124 can be any custom made or commercially available processor, a central processing unit (CPU), a graphics processing unit (GPU), an auxiliary processor among several processors associated with the controller 110, a semiconductor based microprocessor (in the form of a microchip or chip set), a macroprocessor, any combination thereof, or generally any device for executing instructions. The computer readable storage device or media 126 may include volatile and nonvolatile storage in read-only memory (ROM), random-access memory (RAM), and keep-alive memory (KAM), for example. KAM is a persistent or non-volatile memory that may be used to store various operating variables while the processor 124 is powered down. The computer-readable storage device or media 126 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 110 in controlling the isolation control unit 112, the regulator 114, the direction control unit 116 and the solenoid 118, respectively.

The instructions may include one or more separate programs, each of which comprises an ordered listing of executable instructions for implementing logical functions. The instructions, when executed by the processor 124, receive and process signals from the isolation control unit 112 and the human-machine interface of the vehicle 99 (FIG. 1), perform logic, calculations, methods and/or algorithms for automatically controlling the components of the actuator system 100, and generate control signals to the isolation control unit 112, the regulator 114, the direction control unit 116 and the solenoid 118 to control the position of the actuators 122 based on the logic, calculations, methods, and/or algorithms. In this example, the controller 110 is illustrated as part of the actuator system 100, but it should be understood that the controller 110 may be a controller associated with the gas turbine engine 108 (FIG. 1), such as a FADEC, or a controller associated with the vehicle 99.

The isolation control unit 112 is in fluid communication with the pump 120 and the regulator 114. The isolation control unit 112 is responsive to one or more control signals from the controller 110 to open to enable fluid to flow to the regulator 114, and is responsive to one or more control signals to close to inhibit the flow of fluid to the regulator 114. In one example, the isolation control unit 112 is a control valve. Generally, based on the receipt of input from the human-machine interface to move the thrust reverser 102 to the first, deployed position or the second, stowed position, the controller 110 outputs the one or more control signals to the isolation control unit 112 to open to enable fluid to flow from the pump 120. The controller 110 outputs the one or more control signals to the isolation control unit 112 to close to inhibit the flow of fluid based on sensor feedback that indicates that the thrust reverser 102 has reached the desired position, for example. Based on the receipt of input from the human-machine interface to move the thrust reverser 102 to the first, deployed position or second, stowed position, the controller 110 also outputs one or more control signals to the regulator 114. Once the isolation control unit 112 opens, the controller 110 also determines whether the solenoid 118 should be energized or if the isolation control unit 112 is in a fault state. If the isolation control unit 112 is not in the fault state, the controller 110 outputs one or more control signals to the solenoid 118 to move lock systems 136 associated with the actuators 122 to an unlocked state.

The regulator 114 is in fluid communication with the isolation control unit 112 and the direction control unit 116. The regulator 114 is responsive to the one or more control signals from the controller 110 to limit an amount of fluid that flows through the regulator 114 to the direction control unit 116. By limiting the amount of fluid that flows to the direction control unit 116, the regulator 114 allows for snubbing at the beginning and ending of a stroke of the actuators 122.

The direction control unit 116 is responsive to one or more control signals from the controller 110 to supply fluid to a first port 128 of the actuator 122a or to a second port 134 of the actuator 122b. Stated another way, the direction control unit 116 switches a direction of flow to the actuators 122, which in turn, results in the rotation of the actuators 122 in a clockwise or counterclockwise direction. For example, the flow of fluid to the first port 128 from the direction control unit 116 results in a counterclockwise rotation of the actuators 122a, 122b, and the flow of fluid to the second port 134 results in a clockwise rotation of the actuators 122a, 122b. The counterclockwise rotation of the actuators 122a, 122b extends the actuators 122a, 122b, thereby moving the thrust reverser 102 (FIG. 1) to the first, deployed position. The clockwise rotation of the actuators 122a, 122b retracts the actuators 122a, 122b, thereby moving the thrust reverser 102 (FIG. 1) to the second, stowed position and to the third, overstowed position. Generally, the direction control unit 116 directs the pressurized fluid to the second port 134 to turn the actuators 122 clockwise, which stows and overstows the thrust reverser 102. In one example, the direction control unit 116 is a three-way control valve. The direction control unit 116 is in fluid communication with the regulator 114, the pump 120 and the actuators 122. The direction control unit 116 receives the fluid from the regulator 114, directs the fluid to the actuators 122 and returns the fluid to the pump 120. The direction control unit 116 is also responsive to one or more control signals from the controller 110 to close or to inhibit the flow of the fluid back to the pump 120, which results in a closed loop system for the actuators 122. This enables a single one of the actuators 122 to be manually driven, which in turn, drives the other actuator 122 by the same amount without requiring any additional fluid. In the position shown in FIG. 3, the direction control unit 116 allows the pressurized fluid to return to the pump 120 without any affect to the actuators 122.

The actuator 122a has the first port 128 and a second port 130. Similarly, the actuator 122b has a first port 132 and the second port 134. The first port 128 of the actuator 122a is fluidly coupled to the second port 130 of the actuator 122a such that when the first port 128 is an inlet, the second port 130 is an outlet and vice versa. The first port 132 of the actuator 122b is fluidly coupled to the second port 134 of the actuator 122b such that when the first port 132 is an inlet, the second port 134 is an outlet and vice versa. The first port 132 of the actuator 122b is fluidly coupled to or in fluid communication with the second port 130 of the actuator 122a, and the second port 130 of the actuator 122a is fluidly coupled to the first port 132 of the actuator 122b. Thus, the fluid supplied to the first port 128 of the actuator 122a from the direction control unit 116 is supplied from the second port 130 (the outlet of the actuator 122a) to the first port 132 of the actuator 122b. The second port 134 returns the fluid to the direction control unit 116. Similarly, fluid supplied to the second port 134 of the actuator 122b from the direction control unit 116 is supplied from the first port 132 (the outlet of the actuator 122b) to the second port 130 of the actuator 122a. The first port 128 returns the fluid to the direction control unit 116.

The solenoid 118 is responsive to the one or more control signals received from the controller 110 to move the lock systems 136 associated with the actuators 122 to an unlocked state. The solenoid 118 is fluidly coupled to the lock systems 136. The solenoid 118 is an electronically actuated solenoid, such as a one way, spring return, electronically actuated hydraulic solenoid. In this example, the solenoid 118 includes a piston and a spring, which is disposed in a chamber. The one or more control signals received by the solenoid 118 causes the solenoid 118 to overcome the spring force and retract the piston or move the piston relative to the chamber. Considering this is a closed loop fluid system, the volume of the pressurized fluid is constant or unchanging, so any motion of the solenoid 118 is transferred by the pressurized fluid to the pistons 374 of the lock system 136. Upon receipt of the one or more control signals, the solenoid 118 retracts the piston, which creates a vacuum that draws the fluid associated with the lock systems 136 into the chamber of the solenoid 118. This flow of fluid into the solenoid 118 moves the lock systems 136 to the unlocked state. With the piston and the spring disposed in the chamber, the solenoid 118 maintains the lock systems 136 is a lock state as will be discussed.

The pump 120 is fluidly coupled to the isolation control unit 112 and the direction control unit 116. The pump 120 supplies the fluid to the isolation control unit 112, and receives the fluid from the direction control unit 116. In one example, the pump 120 is a hydraulic pump and the fluid is hydraulic fluid. In this example, the pump 120 is coupled to a gearbox associated with the gas turbine engine 108 (FIG. 1).

The actuators 122 are fluidly coupled to the direction control unit 116 to receive the fluid, and are responsive to the fluid to move the thrust reverser 102 (FIG. 1) relative to the gas turbine engine 108 (FIG. 1). With reference back to FIG. 1, the actuators 122 are each coupled to the frame 106 with a mounting bracket 138. The mounting bracket 138 includes a frame coupling flange 142 and a pair of actuator coupling flanges 144. The frame coupling flange 142 is coupled to the frame 106 with mechanical fasteners, such as bolts, and the actuator coupling flanges 144 extend outwardly from the frame coupling flange 142 so as to be substantially perpendicular to the frame coupling flange 142. The actuator coupling flanges 144 are spaced apart on the frame coupling flange 142 to enable a portion of the actuators 122 to pass through the frame 106 to be coupled to the translating cowl 104 (FIG. 2). The actuator coupling flanges 144 also define a bore, which enables a portion of the actuators 122 to pass through the actuator coupling flanges 144.

Figure 4:
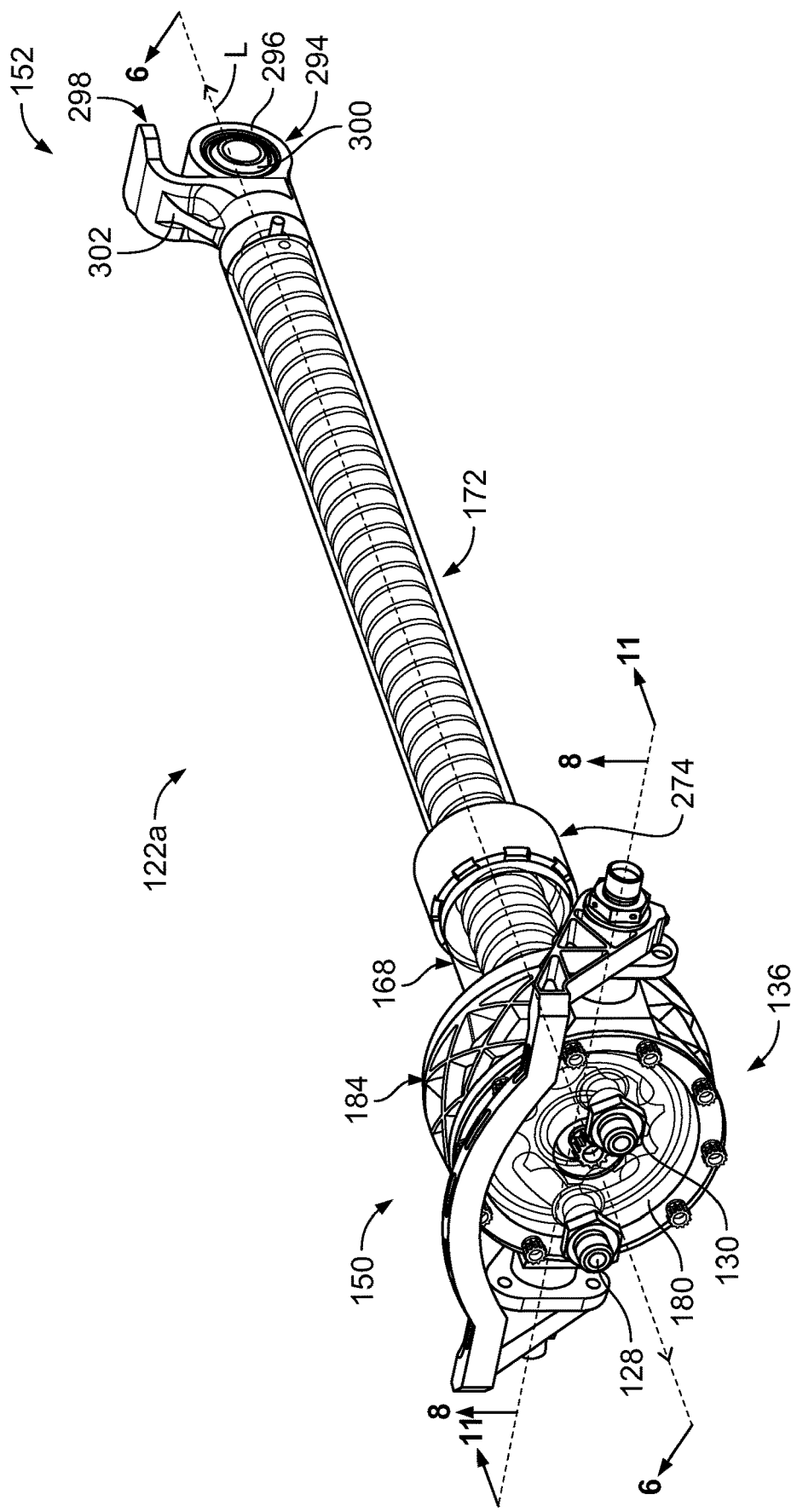
FIG. 4 is a perspective view of one actuator of the actuator system of FIG. 1.

As each of the actuators 122a, 122b is the same and operate in the same or similar manner, a single one of the actuators 122a, 122b will be described herein for ease of description. With reference to FIG. 4, the actuator 122a is shown. The actuator 122a includes a first actuator end 150 opposite a second actuator end 152. The first actuator end 150 is accessible from the exterior of the frame 106 (FIG. 1) to enable a manual actuation of the actuator 122a, as will be discussed. The second actuator end 152 is coupled to the translating cowl 104 (FIG. 2). In one example, with reference to FIG. 5, the actuator 122a includes a gerotor housing 160, a gerotor 162, at least one bearing 164, a seal 166, a ball screw 168, a ball nut 170, an extension shaft 172 and the lock system 136.

Figure 6:
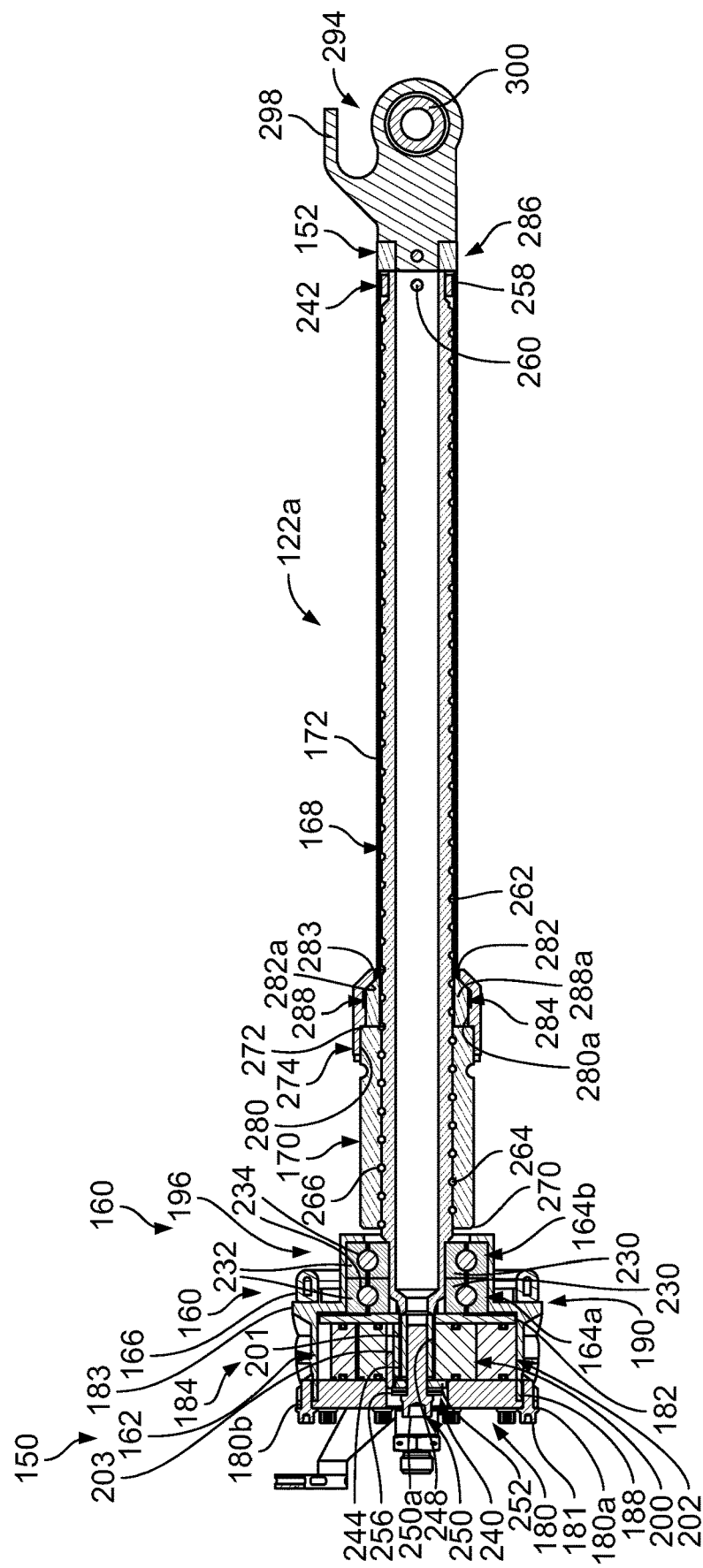
FIG. 6 is a cross-sectional view of the actuator of FIG. 4, taken along line 6-6 of FIG. 4.

The gerotor housing 160 encloses the gerotor 162. The gerotor housing 160 includes a housing cover 180, a seal plate 182 and a cylindrical housing body 184. The housing cover 180 is circular, and defines the first port 128 and the second port 130. The housing cover 180 also includes a plurality of bores 180a, which each receive a respective mechanical fastener 181, such as a bolt, to couple the housing cover 180 to the housing body 184. The plurality of bores 180a may be defined on a flange 180b of the housing cover 180, which has a reduced thickness when compared to a remainder of the housing cover 180 (FIG. 6). Hydraulic fittings 186 are coupled to the first port 128 and the second port 130 to enable fluid communication between the gerotor 162 and the direction control unit 116 (FIG. 3). The seal plate 182 is circular, and defines a central opening 182a. The central opening 182a enables the ball screw 168 to be coupled to the seal plate 182. In one example, the central opening 182a includes a plurality of splines 183 to couple the seal plate 182 to the ball screw 168. The seal plate 182 pilots on the ball screw 168. The seal plate 182 assists in forming a seal against the housing body 184 to inhibit the fluid from escaping the gerotor housing 160.

The housing body 184 receives the gerotor 162. The housing body 184 has a first housing end 188 opposite a second housing end 190. The first housing end 188 is coupled to or interconnected with the second housing end 190 via a sidewall 192. The first housing end 188 is circumferentially open. The first housing end 188 defines a plurality of bores 184a, which are coaxially aligned with the plurality of bores 180a of the housing cover 180 to couple the housing cover 180 to the housing body 184 with the respective mechanical fasteners 181. The second housing end 190 defines an internal flange 194 and includes a coupling projection 196. The internal flange 194 extends radially inward at the second housing end 190 and provides a seat for the seal plate 182. With reference to FIG. 6, the coupling projection 196 extends axially outward from the internal flange 194 toward the second actuator end 152. The coupling projection 196 is cylindrical. The coupling projection 196 is circumferentially closed, and defines a central opening 196a. The central opening 196a enables a portion of the ball screw 168 to be received within the housing body 184. With reference back to FIG. 5, the sidewall 192 may include a plurality of struts for reinforcement about the perimeter of the housing body 184. The sidewall 192 defines a pair of lock receiving bores 198. The lock receiving bores 198 are opposite each other about the perimeter or circumference of the housing body 184, and each lock receiving bore 198 receives a respective portion of the lock system 136 to couple the lock system 136 to the gerotor 162.

The gerotor 162 is disposed within the gerotor housing 160, and is fluidly coupled to the first port 128 and the second port 130. The gerotor 162 includes an inner rotor 200 and an outer rotor 202. The inner rotor 200 rotates about an axis, which is offset from an axis of rotation of the outer rotor 202. The inner rotor 200 defines an inner central bore 199 about an inner perimeter or diameter of the inner rotor 200, and has a plurality of teeth 204 defined about an outer perimeter or diameter of the inner rotor 200. The inner central bore 200a includes a plurality of splines 201. The plurality of splines 201 couple the inner rotor 200 to the ball screw 168. The inner rotor 200 pilots on the ball screw 168. The inner rotor 200 also includes at least one pilot bore 203, which assists in coupling the ball screw 168 to the inner rotor 200. The inner rotor 200 generally has a number of the teeth 204 that is one less than a number of a plurality of teeth 206 of the outer rotor 202. The difference in the number of teeth 204, 206 results in a volumes or chambers being defined between the teeth 204, 206. Generally, as the fluid enters the gerotor 162 via the first port 128, the volume of the fluid increases, which causes the chambers to want to expand, resulting in the counterclockwise rotation of the inner rotor 200 and the outer rotor 202. As the fluid circulates within the gerotor 162, the fluid flows through the second port 130 to the actuator 122b (FIG. 3). When the fluid enters the gerotor 162 via the second port 130, the volume of the fluid increases, which causes the chambers to want to expand, resulting in the clockwise rotation of the inner rotor 200 and the outer rotor 202. As the fluid circulates within the gerotor 162, the fluid flows through the first port 128 to the direction control unit 116 (FIG. 3). It should be noted that while the inner rotor 200 is illustrated herein as including 8 teeth 204, and the outer rotor 202 is illustrated herein as including 9 teeth 206, the inner rotor 200 may include any number of teeth 204 and the outer rotor 202 may include any number of teeth 206 that is one tooth greater than the number of teeth 204. The inner rotor 200 and the outer rotor 202 may also include timing marks to assist in the alignment of the inner rotor 200 relative to the outer rotor 202.

The outer rotor 202 has the teeth 206 defined about an inner perimeter or diameter 202a of the outer rotor 202, and the outer rotor 202 has a plurality of rotor lock bores 210 defined about the outer perimeter or diameter 202b of the outer rotor 202. The rotor lock bores 210 are spaced apart about the outer diameter 202b to receive a portion of the lock system 136 as will be discussed. In this example, the rotor lock bores 210 include a first overstow bore 212, a second overstow bore 214 and lock bores 216. The first overstow bore 212 and the second overstow bore 214 each has a dimension that is different and greater than the lock bores 216. In one example, the first overstow bore 212 and the second overstow bore 214 are substantially elliptical, grooved, slotted, or elongated holes (FIG. 11), and enable for additional movement of the gerotor 162 to move the thrust reverser 102 (FIG. 1) to the third, overstowed position. In this example, the first overstow bore 212 and the second overstow bore 214 have a major axis with a length that is greater than a diameter of the lock bores 216 or a remainder of the rotor lock bores 210. The first overstow bore 212 and the second overstow bore 214 are defined on opposite sides of the outer rotor 202 to receive the portion of the lock system 136. The first overstow bore 212 is defined about 180 degrees apart from the second overstow bore 214 about the circumference of the outer rotor 202. The lock bores 216 are defined about the outer diameter 202b between the first overstow bore 212 and the second overstow bore 214, and are spaced apart about the outer diameter 202b. Generally, the lock bores 216 are defined about the circumference of the outer rotor 202 such that there is a respective lock bore 216 about 180 degrees apart from another opposing lock bore 216 between the first overstow bore 212 and the second overstow bore 214. In addition, one or more sealing rings 220, 222, such as elastomeric O-rings, may be coupled to grooves formed in opposed sides of both the inner rotor 200 and the outer rotor 202, respectively. The sealing rings 220, 222 assist in defining a seal between the inner rotor 200, the outer rotor 202 and the housing cover 180 on a first side of the inner rotor 200 and the outer rotor 202, and assist in defining a seal between the inner rotor 200, the outer rotor 202 and the seal plate 182.

In one example, the least one bearing 164 is a duplex bearing and includes a first bearing 164a and a second bearing 164b. The bearings 164a, 164b include, but are not limited to, ball bearings. In this example, with reference to FIG. 6, the bearings 164a, 164b each include an inner race 230 and an outer race 232 with a plurality of rolling elements 234 retained between the inner race 230 and the outer race 232. The bearings 164a, 164b are coupled to the housing body 184 so as to be press-fit within the coupling projection 196. Generally, the bearings 164a, 164b are positioned within the coupling projection 196 such that the seal plate 182 contacts the inner race 230 of the bearing 164a. The seal plate 182 does not typically contact the outer race 232 of the bearing 164a. The ball screw 168 is piloted by the bearings 164a, 164b.

The seal 166 is coupled to the housing body 184 so as to be proximate or at the second housing end 190. Generally, the seal 166 is coupled to the housing body 184 at the second housing end 190 to extend about or circumscribe the coupling projection 196. The seal 166 is annular, and in one example, is a thermal event seal. The seal 166 is generally composed of one or more high temperature resistant materials, which assist in inhibiting the spread of a thermal event to or from the thrust reverser 102 (FIG. 1).

The ball screw 168 cooperates with the ball nut 170 to move or translate the extension shaft 172. In one example, the ball screw 168 is coupled to the gerotor 162, and the rotation of the gerotor 162 rotates the ball screw 168. The rotation of the ball screw 168 results in a translation of the ball nut 170, and thus, the extension shaft 172 coupled to the ball nut 170. The ball screw 168 has a first screw end 240 opposite a second screw end 242. The first screw end 240 includes a plurality of screw splines 244. The plurality of screw splines 244 are keyed or configured to mate with the plurality of splines 201 of the inner rotor 200 of the gerotor 162 to couple the ball screw 168 to the inner rotor 200. The plurality of screw splines 244 are also keyed or configured to mate with the plurality of splines 183 of the seal plate 182 to couple the seal plate 182 to the ball screw 168. In one example, the first screw end 240 also defines a screw bore 246. The screw bore 246 receives a locking insert 248 and a mechanical fastener 250. The locking insert 248 is a sleeve, which is fixedly coupled to the ball screw 168 at the first screw end 240. The locking insert 248 defines a plurality of internal threads, which cooperate with a plurality of threads of the mechanical fastener 250. In one example, a washer 252 is coupled to the side of the inner rotor 200, and the position of the washer 252 is clocked to the inner rotor 200 via at least one pin 254 that is press-fit into the pilot bore 203 to inhibit a rotation of the washer 252. It should be noted that while a single pin 254 and pilot bore 203 are shown, multiple pins 254 and pilot bores 203 may be employed. In addition, two serrated washers 256 may be coupled between a head 250a of the mechanical fastener 250 and the washer 252. The serrated washers 256 lock the position of the mechanical fastener 250 when a torque is not being applied to the head 250a of the mechanical fastener 250.

The mechanical fastener 250, in one example, is a bolt that includes the head 250a and a shank 250b. The head 250a is shaped and is configured to receive a tool, such as a socket wrench, ratchet, etc. to enable the tool to rotate or drive the mechanical fastener 250. Thus, the head 250a may be a hex-head, etc. The shank 250b includes the plurality of external threads that engage with the internal threads of the locking insert 248. By providing the mechanical fastener 250, which is manually rotatable by a tool, a technician may use the tool to manually move the thrust reverser 102 (FIG. 1). Stated another way, the rotation of the mechanical fastener 250 rotates the ball screw 168 via the locking insert 248, which is fixed to the ball screw 168. The rotation of the ball screw 168 counterclockwise or clockwise translates the ball nut 170 and thereby moves the thrust reverser 102 (FIG. 1) between the first, deployed position, the second, stowed position and the third, overstowed position. Generally, the locking insert 248 and the serrated washers 256 ensure that a breakaway torque for the mechanical fastener 250 is not exceeded during manual translation of the thrust reverser 102 (FIG. 1).

The second screw end 242 includes a travel stop 258. In one example, the travel stop 258 is an annular ring, which inhibits the further advancement of the ball nut 170. The travel stop 258 is coupled to the ball screw 168 at the second screw end 242 via one or more pins 260, however, other techniques may be employed to couple the travel stop 258 to the ball screw 168.

The ball screw 168 also defines a plurality of ball screw threads 262. The ball screw threads 262 are defined about the perimeter or circumference of the ball screw 168 from proximate the first screw end 240 to the second screw end 242. The ball screw threads 262 cooperate with ball nut threads 264 to enable roller elements 266, such as balls, to be received between the ball screw 168 and the ball nut 170 to guide the motion of the ball nut 170 relative to the ball screw 168. In one example, the ball screw threads 262 and the ball nut threads 264 are each right hand threads.

The ball nut 170 is substantially cylindrical, and includes a first nut end 270 opposite a second nut end 272. The ball nut threads 264 are defined from the first nut end 270 to the second nut end 272. The ball nut threads 264 are defined about an inner perimeter of the ball nut 170. The ball nut 170 is coupled to the extension shaft 172 at the second nut end 272. In one example, an adaptor 274 couples the ball nut 170 to the extension shaft 172. In this example, the adaptor 274 is cylindrical, and includes a first adaptor end 276 and an opposite second adaptor end 278. The first adaptor end 276 defines a receptacle 280 that receives the second nut end 272. The adaptor 274 may include a flange 280a that extends radially inward to provide a stop for the advancement of the second nut end 272. The first adaptor end 276 is coupled to the second nut end 272 via interference fit, welding, etc. The second adaptor end 278 is coupled to the extension shaft 172. The second adaptor end 278 includes a taper 282 that surrounds an opening 283. The taper interfaces with a first shaft end 284 of the extension shaft 172 to couple the extension shaft 172 to the adaptor 274. Generally, the taper 282 defines an internal contact surface 282a, which abuts and contacts the first shaft end 284 when the extension shaft 172 is coupled to the adaptor 274. The opening 283 is sized to enable the extension shaft 172 to pass through.

Figure 5:
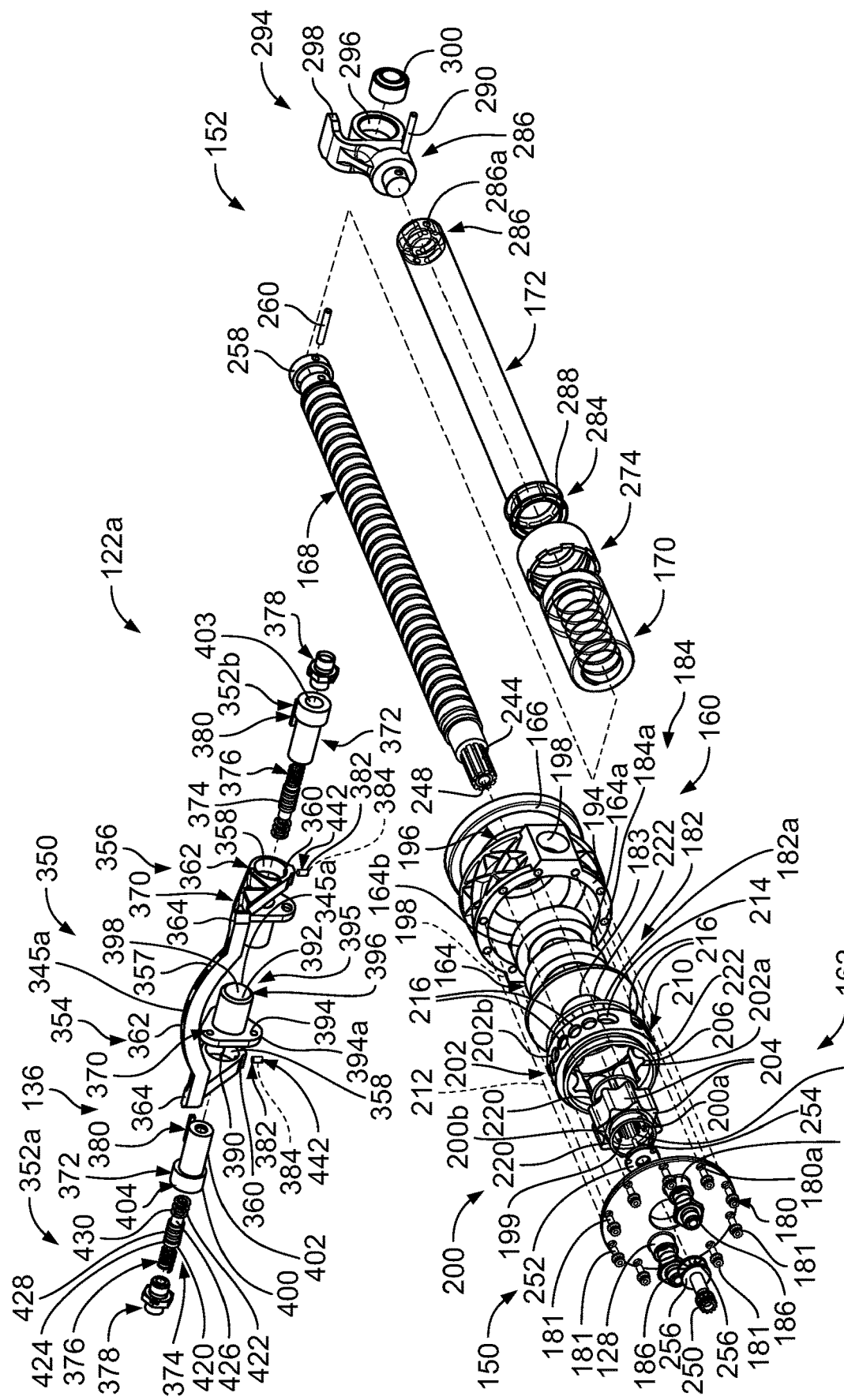
FIG. 5 is an exploded view of the actuator of FIG. 4.

The extension shaft 172 includes the first shaft end 284 and an opposite second shaft end 286. The extension shaft 172 is hollow from the first shaft end 284 to the second shaft end 286 to enable the ball screw 168 to be received within and to move relative to the extension shaft 172. The first shaft end 284 includes a collar 288. The collar 288 includes a tapered surface 288a. The tapered surface 288a of the collar 288 cooperates with the taper 282 of the adaptor 274 to couple the extension shaft 172 to the adaptor 274. The collar 288 is annular. The extension shaft 172 may also be coupled to the adaptor 274 via welding, adhesives, etc. The second shaft end 286 is coupled to the second actuator end 152. With reference to FIG. 5, in one example, the second shaft end 286 defines a bore 286a, which receives a press-fit pin 290 to couple the second actuator end 152 to the extension shaft 172. It should be noted that the second shaft end 286 may also include a collar about the second shaft end 286 to provide reinforcement for the pressed in pin 290.

The second actuator end 152 includes a coupling portion 292 integrally formed with an attachment portion 294. The coupling portion 292 is substantially cylindrical, and is shaped to be partially received within the extension shaft 172. The coupling portion 292 defines a bore 292a, which is coaxial with the bore 286a to receive the pin 290 to couple the second actuator end 152 to the extension shaft 172. The attachment portion 294 defines an attachment bore 296 and an anti-rotation flange 298. With reference to FIG. 4, the attachment bore 296 has a central axis that is substantially perpendicular to a longitudinal axis L of the actuator 122a. The attachment bore 296 is sized to receive a bearing 300, such as a spherical bearing. A mechanical fastener, such as a bolt, may be installed through the bearing 300 to couple the second actuator end 152 to the thrust reverser 102 (FIG. 2). The anti-rotation flange 298 is a substantially planar portion of the second actuator end 152, and is defined to extend axially over the attachment bore 296. The anti-rotation flange 298 is spaced a distance apart from the attachment bore 296. The anti-rotation flange 298 is configured to contact a surface of the thrust reverser 102 (FIG. 2) to inhibit a rotation of the actuator 122a during a movement of the thrust reverser 102. A strut 302 may be defined between the coupling portion 292 and the anti-rotation flange 298 to provide reinforcement.

Figure 7:
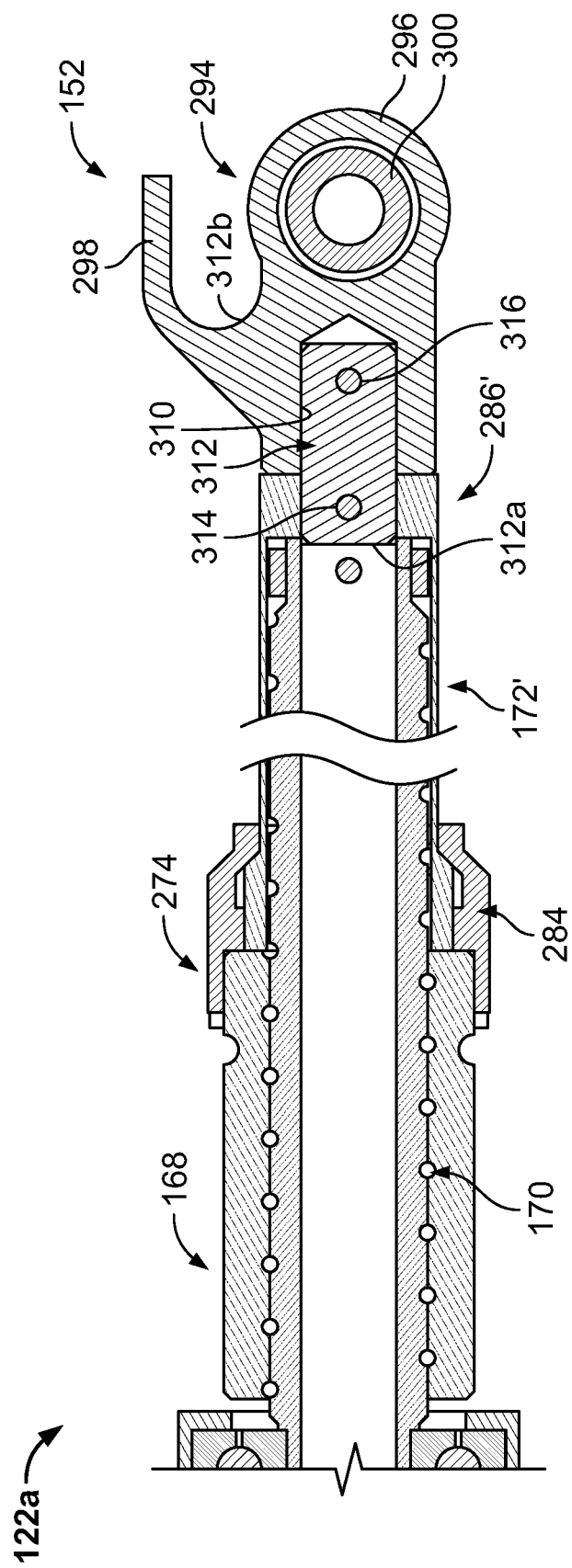
FIG. 7 is a cross-sectional view of another exemplary second actuator end for the actuator of FIG. 4.

It should be noted that in other embodiments, the second actuator end 152 may be coupled to the extension shaft 172 differently. For example, with reference to FIG. 7, a connecting shaft 312 may be employed to couple a second shaft end 286' of an extension shaft 172' to a second actuator end 152'. As the second actuator end 152' is substantially similar or the same as the second actuator end 152, the same reference numerals will be used to denote the same or similar components. In this example, the second actuator end 152' includes a coupling portion 292' and the attachment portion 294. The coupling portion 292' includes a coupling bore 310. The coupling bore 310 is threaded to matingly engage with threads defined on a connecting shaft 312. Alternatively, the connecting shaft 312 may be press-fit into the coupling bore 310. The extension shaft 172' includes the first shaft end 284 and the second shaft end 286'. The second shaft end 286' may also include a plurality of threads, which matingly engage with the threads defined on the connecting shaft 312. Alternatively, the connecting shaft 312 may be press-fit into the second shaft end 286' of the extension shaft 172. Thus, the connecting shaft 312 has a first end 312a coupled to the second shaft end 286', and a second end 312b coupled to the coupling bore 310 of the coupling portion 292'. Pins 314, 316 may be press-fit into the second shaft end 286' and the connecting shaft 312, and into the coupling portion 292' and the connecting shaft 312, respectively, to further couple the second actuator end 152' to the second shaft end 286' of the extension shaft 172'.

With reference back to FIG. 5, the lock system 136 includes a grippable member or handle 350 and at least one lock assembly 352. In this example, the lock system 136 includes two lock assemblies 352a, 352b, which are the same and are symmetric about the longitudinal axis L of the actuator 122a (FIG. 4). The handle 350 is movable by a technician to move the actuator 122a between the lock state and the unlocked state in a manual override of the lock system 136. This enables a technician to manually move the actuator 122a when the controller 110 is powered down or off, for example. Generally, the handle 350 is movable between a locked position and an unlocked position. In the locked position of the handle 350, the state of the lock system 136 is controlled by the controller 110. In the unlocked position of the handle 350, the lock system 136 is in the unlocked state. The handle 350 is substantially C-shaped, and includes a first handle arm 354, a second handle arm 356 and a connecting arm 357. The first handle arm 354 is opposite the second handle arm 356. Each of the first handle arm 354 and the second handle arm 356 define a lock receiving bore 358 and a detent bore 360 at a first arm end 362. Each of the first handle arm 354 and the second handle arm 356 are coupled to the connecting arm 357 at a second arm end 364, and the first arm end 362 is opposite the second arm end 364. Generally, the second arm end 364 extends outwardly from the first arm end 362 at an angle such that when assembled, the handle 350 is positioned above or outboard of the first port 128 and the second port 130 of the actuator 122a so that the technician does not interfere with the hydraulic coupling at the first port 128 and the second port 130 while gripping the handle 350.

The lock receiving bore 358 has a central axis that is substantially perpendicular to the longitudinal axis L (FIG. 4). The lock receiving bore 358 of the first handle arm 354 is coaxial with the lock receiving bore 358 of the second handle arm 356. The lock receiving bore 358 of the first handle arm 354 is coupled to the lock assembly 352a, while the lock receiving bore 358 of the second handle arm 356 is coupled to the lock assembly 352b. The detent bore 360 is in communication with the lock receiving bore 358. The detent bore 360 is sized to receive a portion of the respective lock assembly 352a, 352b. The detent bore 360 is defined through the lock receiving bore 358, and in one example, includes a plurality of threads. The connecting arm 357 is integrally formed with the first handle arm 354 and the second handle arm 356. The connecting arm 357 is arcuate to provide a graspable or manipulatable surface for the technician to grip to move the handle 350.

Figure 8:
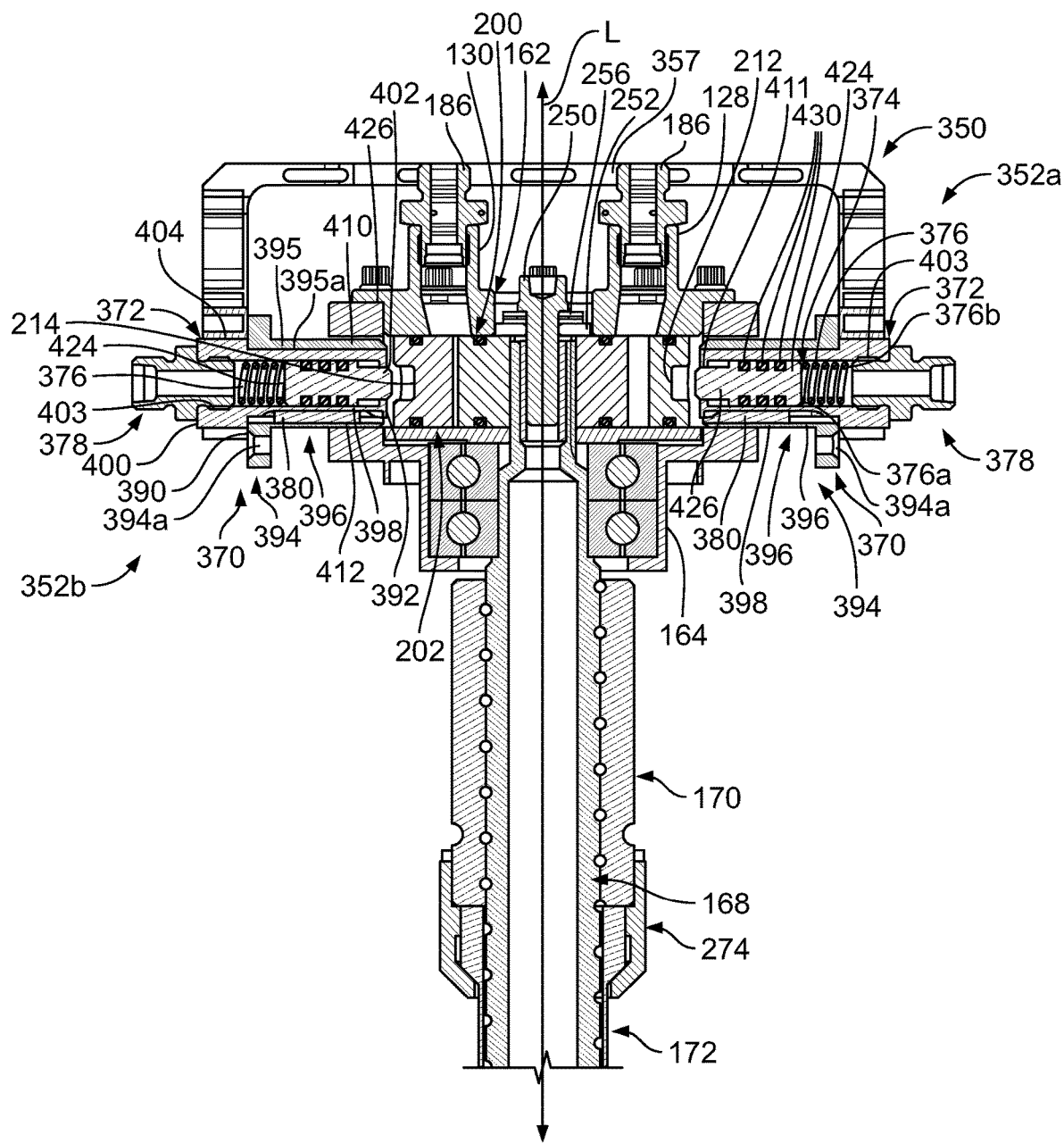
FIG. 8 is a cross-sectional view of the actuator of FIG. 4, taken along line 8-8 of FIG. 4, which illustrates a lock system associated with the actuator in the unlocked state.

Each of the lock assemblies 352a, 352b include a trunnion 370, a piston housing 372, a piston 374, a piston biasing member or piston spring 376, a fitting 378, a key 380, a detent pin 382 and a detent pin biasing member or detent spring 384. The trunnion 370 is composed of a metal or metal alloy, and is cast, forged, stamped, additively manufactured, etc. The trunnion 370 has a first trunnion end 390 opposite a second trunnion end 392. The first trunnion end 390 includes a trunnion flange 394, which is substantially triangular. It should be noted that the trunnion flange 394 may have any desired shape. The trunnion flange 394 couples the actuator 122a to the thrust reverser 102 (FIG. 1). In this example, the trunnion flange 394 defines a plurality of coupling bores 394a, which each receive a mechanical fastener, such as a bolt, pin, etc. for coupling the trunnion 370 to the respective one of the actuator coupling flanges 144 of the mounting bracket 138 (FIG. 1). The coupling bores 394a are spaced apart about the trunnion flange 394. The trunnion 370 also includes a trunnion projection 396. A central trunnion bore 395 (FIG. 8) is defined through the trunnion flange 394 and the trunnion projection 396, from the first trunnion end 390 to the second trunnion end 392, and is configured to receive the piston housing 372. In this example, the trunnion projection 396 is cylindrical and extends from the trunnion flange 394 to the second trunnion end 392. In this example, the trunnion 370 also defines a trunnion key slot 398 that extends axially along an inner diameter 395a of the trunnion bore 395 from proximate the second trunnion end 392 to the trunnion flange 394. With reference to FIG. 8, a cross-section through the actuator 122a at the lock system 136 is shown. In FIG. 8, the lock system 136 is in an unlocked state. The trunnion key slot 398 is defined through the trunnion 370 to be spaced a distance apart from the second trunnion end 392. This ensures that the key 380 remains retained within the trunnion key slot 398 during a movement of the piston housing 372 toward the gerotor 162. The trunnion key slot 398 is defined through the trunnion flange 394 to enable the key 380 to be inserted into the trunnion 370 during assembly.

Figure 9:
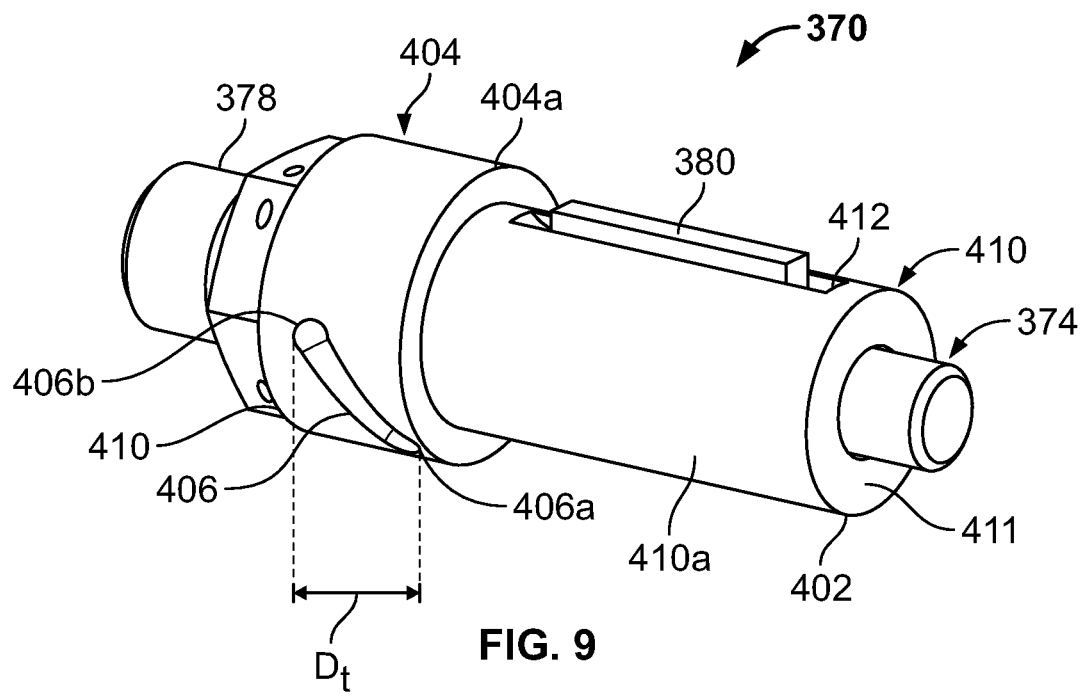
FIG. 9 is a perspective view of a piston housing coupled to a fitting and a piston associated with the lock system associated with the actuator.
Figure 10:
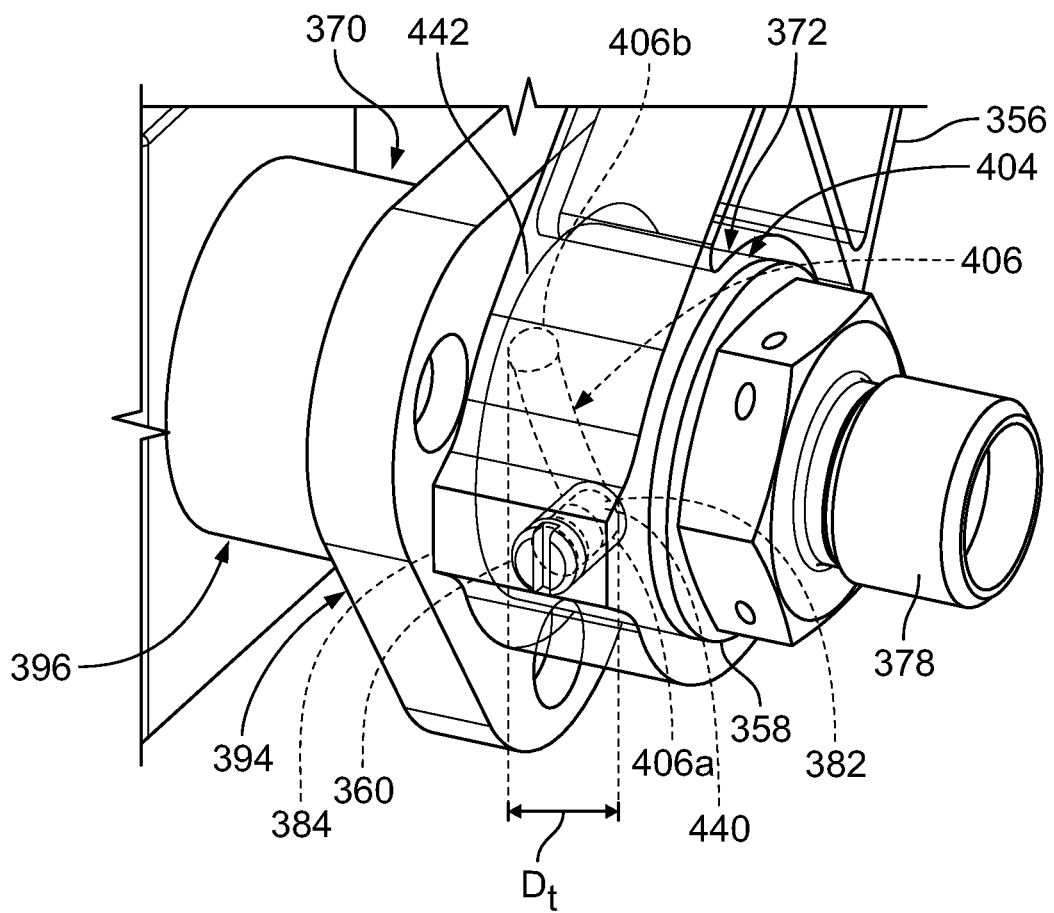
FIG. 10 is a perspective detail view of a handle of the lock system coupled to the piston housing in accordance with various embodiments.

The piston housing 372 is composed of metal or metal alloy, and is cast, stamped, additively manufactured, etc. With reference back to FIG. 5, the piston housing 372 includes a first housing end 400 opposite a second housing end 402. A central housing bore 403 (FIG. 8) is defined through the piston housing 372 from the first housing end 400 to the second housing end 402, and is configured to receive the piston 374, the piston spring 376 and a portion of the fitting 378. The central housing bore 403 may include threads at the first housing end 400 for coupling the fitting 378 to the piston housing 372. The first piston end 420 includes a piston collar 404. With reference to FIG. 9, the piston housing 372 is shown assembled with the piston 374, the piston spring 376, the fitting 378 and the key 380. The piston collar 404 includes a detent groove 406. The detent groove 406 is a helical groove defined to extend along an arc on an exterior surface 404a of the piston collar 404. With reference to FIG. 10, the detent groove 406 receives the detent pin 382 and cooperates with the detent pin 382 to limit a range of travel of the handle 350. In this example, a distance Dt between a first groove end 406a and a second groove end 406b results in the handle 350 moving vertically a predetermined amount. Generally, the handle 305 moves vertically a distance to create an interference with a portion of the thrust reverser 102 (FIG. 14) as will be discussed. In addition, the distance Dt is the amount the piston housing 372 is allowed to move relative to the trunnion 370 between the lock state and the unlocked state. In this regard, when the detent pin 382 is in the first groove end 406a, the piston housing 372 is retracted relative to the trunnion 370 and the lock system 136 is in the lock state. When the detent pin 382 is in the second groove end 404b, the piston housing 372 travels within the trunnion 370 toward the second trunnion end 392 (FIG. 8) and the lock system 136 is in the unlocked state.

With reference back to FIG. 9, the piston housing 372 also includes a housing projection 410. In this example, the housing projection 410 is cylindrical and extends from the piston collar 404 to the second piston end 422. The housing projection 410 includes a flange 411 that extends radially inward at the second housing end 402, which serves as a stop for a further advancement of the piston 374 (FIG. 8). In this example, the piston housing 372 also defines a housing key slot 412 that extends axially along an outer diameter 410a of the housing projection 410 from proximate the second housing end 402 to proximate the piston collar 404. With reference to FIG. 8, the housing key slot 412 is defined on the piston housing 372 to be spaced a distance apart from the second housing end 402 and to be spaced a distance apart from the piston collar 404. This ensures that the key 380 remains retained within the housing key slot 412 during a movement of the piston housing 372 toward the gerotor 162. The housing key slot 412 cooperates with the trunnion key slot 398 to retain the key 380, and inhibits the key 380 from becoming uncoupled from the lock system 136 once the actuator 122a is installed.

With reference to FIG. 5, the piston 374 includes a first piston end 420 opposite a second piston end 422. The piston 374 may be composed of metal or metal alloy, and may be cast, forged, additively manufactured, etc. The piston 374 includes a head 424 at the first piston end 420 and a shaft 426 that extends axially from the head 424 to the second piston end 422. The head 424 is fluidly coupled to the fitting 378 and the piston spring 376 acts on the head 424. As will be discussed, the fluid is received between the head 424 and the fitting 378 in the lock state, and when the solenoid 118 is energized by the controller 110 (FIG. 3), the fluid is drawn through the fitting 378 to the solenoid 118 creating a vacuum that draws the head 424 toward the fitting 378, compressing the piston spring 376, to move the lock system 136 to the unlocked state (FIG. 8). In the unlocked state, the shaft 426 is uncoupled from a respective one of the bores 212, 214, 216, which enables the gerotor 162 to rotate. In the lock state, the shaft 426 of the piston 374 at the second piston end 422 engages with a respective one of the bores 212, 214, 216, which inhibits the rotation of the gerotor 162. In the lock state, the head 424 of the piston 374 generally abuts the flange 411 of the piston housing 372 (FIG. 8). Generally, the shaft 426 is sized to extend beyond the second housing end 402 in both the lock state and the unlocked state. The shaft 426 defines at least one or a plurality of seal grooves 428. In this example, the shaft 426 includes three seal grooves 428, which each receive a respective sealing member 430, such as an O-ring. The sealing members 430 inhibit the fluid from flowing past the head 424 of the piston 374 down the shaft 426.

With reference back to FIG. 8, the piston spring 376 is disposed between the head 424 of the piston 374 and the fitting 378. The piston spring 376 has a first spring end 376a that seats against the head 424 of the piston 374 and a second spring end 376b that seats against the fitting 378. The piston spring 376 is composed of spring steel, and is extruded and coiled. The piston spring 376 is a compression spring, which biases the piston 374 into engagement with the respective one of the bores 212, 214, 216 in the lock state.

The fitting 378 is a hydraulic fitting, which is fluidly coupled to the central housing bore 403 and to the solenoid 118. The fitting 378 is any suitable hydraulic fitting that is capable of directing the fluid to and from the piston housing 372. In one example, the fitting 378 is at least partially received within the central housing bore 403 at the first housing end 400. The fitting 378 may include threads for coupling to the piston housing 372.

The key 380 is rectangular and is received within the trunnion key slot 398 and the housing key slot 412. The key 380 is composed of metal or metal alloy, and is stamped, cast, additively manufactured, etc. The key 380 enables axial motion of the piston housing 372 relative to the trunnion 370, but inhibits the rotation of the piston housing 372 relative to the trunnion 370. The key 380 has a key longitudinal axis, which is substantially perpendicular to the longitudinal axis L of the actuator 122a.

With reference back to FIG. 10, the detent pin 382 includes a ball 440 and a detent housing 442. The ball 440 is sized to be received within the detent groove 406, and is movable within the detent groove 406 between the first groove end 406a and the second groove end 406b based on a movement of the handle 350. The detent housing 442 retains the detent spring 384, and is coupled to the detent bore 360. In one example, the detent housing 442 is coupled to the detent bore 360 via a plurality of threads such that the detent housing 442 may be retracted to enable the assembly of the handle 350 to the piston housing 372. The detent housing 442 is cylindrical, and includes a seat for the detent spring 384 at one end. The ball 440 is disposed at the opposite end of the detent housing 442. The detent spring 384 is a compression spring, and is composed of spring steel, which is extruded and coiled. The detent spring 384 biases the ball 440 into engagement with the detent groove 406. Generally, when the handle 350 is in the locked position, the ball 440 is fully extended into the detent groove 406 by the force of the detent spring 384, and the ball 440 is touching the first groove end 406a of the piston housing 372. When the handle 350 is between the locked and unlocked position, the detent spring 384 is slightly compressed, and the ball 440 is touching the piston housing 372 within the detent groove 406. When the handle 350 is in the unlocked position, the ball 440 is fully extended from the force of the detent spring 384, and the ball 440 is touching the second groove end 406b.

In one example, in order to assemble the actuator 122a, with reference to FIG. 5, with the ball nut and the roller elements 266 coupled to the ball screw 168, the ball screw 168 is coupled to the housing body 184. The bearings 164a, 164b are coupled to the ball screw 168 and the housing body 184. The ball screw 168 is coupled to the inner rotor 200. The outer rotor 202 is coupled about the inner rotor 200. The sealing rings 220, 222 are coupled to the respective one of the inner rotor 200 and the outer rotor 202. The washer 252 is coupled to the inner rotor 200 with the pin 254. The locking insert 248 is coupled to the ball screw 168. The housing cover 180 is coupled to the housing body 184 with the mechanical fasteners 181. The mechanical fastener 250 with the serrated washers 256 is coupled to the locking insert 248. With the extension shaft 172 coupled to the adaptor 274, the adaptor 274 is coupled to the ball nut 170. The travel stop 258 is coupled to the ball screw 168 with the pin 260. With the bearing 300 coupled to the attachment bore 296, the second actuator end 152 is coupled to the extension shaft 172 with the pin 290. The seal 166 is coupled to the housing body 184.

With reference to FIGS. 2 and 5, the second actuator end 152 of the actuator 122a is inserted through the mounting bracket 138 and a bore 499 defined in the frame 106 to couple the second actuator end 152 to the translating cowl 104 of the thrust reverser 102. In one example, the second actuator end 152 is coupled to the translating cowl 104 by inserting a mechanical fastener 500, such as a bolt, through the bearing 300 with the anti-rotation flange 298 resting on a planar surface 502 of the thrust reverser 102. The anti-rotation flange 298 and the planar surface 502 cooperate to inhibit the rotation of the actuator 122a as the actuator 122a moves the thrust reverser 102 between the first, deployed position, the second, stowed position and the third, over-stowed position. The trunnions 370 are inserted through the actuator coupling flanges 144, and into the lock receiving bores 198. The trunnions 370 are coupled to the actuator coupling flanges 144 and the gerotor housing 160 by inserting mechanical fasteners through the coupling bores 394a (FIG. 5). With the sealing members 430 coupled to the pistons 374, the pistons 374 are coupled to the respective piston housing 372. The piston springs 376 are inserted into the central housing bore 403 of the respective piston housing 372. The fittings 378 are coupled to the respective piston housing 372. When there is no fluid pressure in the fluid cavity defined between the head 424 of the pistons 374 and the fittings 378, the pistons 374 are forced against the flange 411 of the respective piston housing 372 (FIG. 8) via the force of the respective piston spring 376. The keys 380 are coupled to the respective housing key slot 412 and the piston housings 372 are coupled to the respective trunnions 370. The detent springs 384 are coupled to the respective detent housing 442, and the balls 440 are coupled to the respective detent housing 442. The detent pins 382 are coupled to the handle 350, and the handle 350 is coupled to the piston housing 372. The detent housing 442 may be advanced by the threads of the detent bore 360 such that the balls 440 are disposed in the first groove end 406a of the detent groove 406 with the handle 350 in the locked position (FIG. 10). The above process for the assembly of the actuator 122a and the coupling of the actuator 122a to the thrust reverser 102 is repeated for the actuator 122b.

Figure 11:
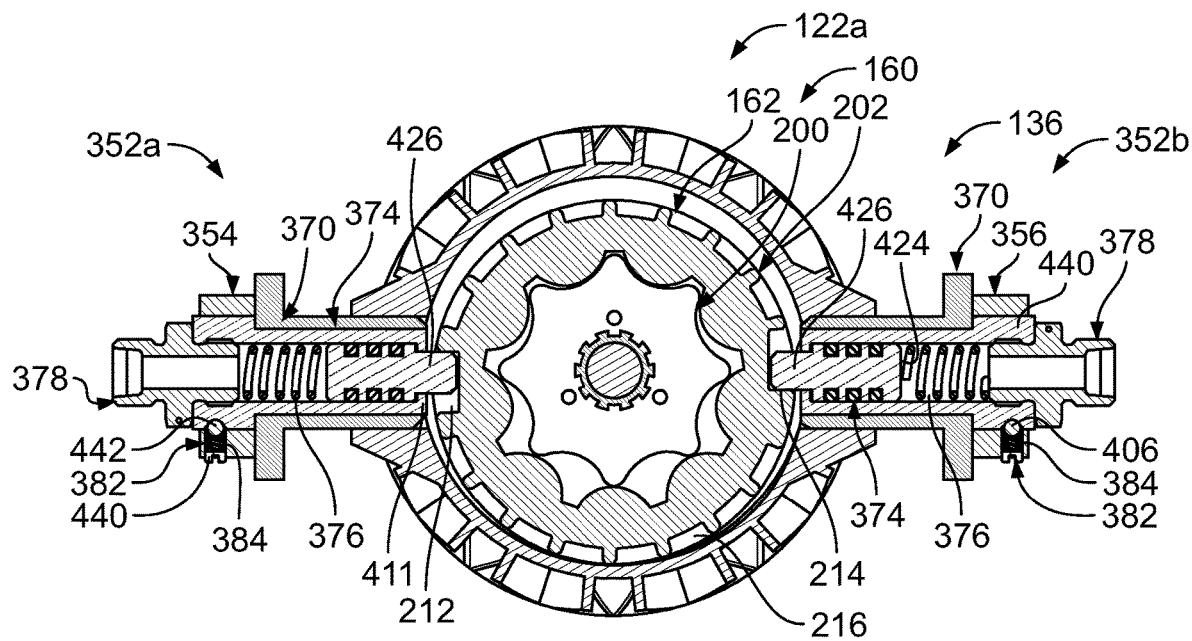
FIG. 11 is a cross-sectional view of the actuator of FIG. 4, taken along line 11-11 of FIG. 4, which illustrates the lock system associated with the actuator in the lock state.

With the actuators 122a, 122b coupled to the thrust reverser 102, with reference to FIG. 3, the first port 128 of the actuator 122a and the second port 134 of the actuator 122b are fluidly coupled to the direction control unit 116. The second port 130 of the actuator 122a is fluidly coupled to the first port 132 of the actuator 122b. The direction control unit 116 is fluidly coupled to the regulator 114 and the pump 120. The isolation control unit 112 is fluidly coupled to the pump 120 and the regulator 114. The solenoid 118 is fluidly coupled to the fittings 378 of the lock system 136. The controller 110 is placed in communication with the solenoid 118, the regulator 114, the isolation control unit 112 and the direction control unit 116. The controller 110 outputs one or more control signals to the solenoid 118 to enable the fluid to flow to the fittings 378 to maintain the lock system 136 in the lock state. With reference to FIG. 11, the lock system 136 is shown in the lock state with the handle 350 in the lock position. In the lock state, the positive fluid pressure in the fluid cavity defined between the head 424 and the fitting 378 forces the piston 374 against the flange 411 along with the force of the piston spring 376. In the lock state, the shaft 426 of the piston 374 at the second piston end 422 is inserted into and received within the respective bore 212, 214.

With the actuator system 100 coupled to the thrust reverser 102 (FIG. 2), based on the receipt of input to move the thrust reverser 102 to the first, deployed position, with reference back to FIGS. 3 and 5, the controller 110 outputs one or more control signals to the solenoid 118 to open the solenoid 118. The opening of the solenoid 118 results in a vacuum being created in the fluid cavity defined between the head 424 and the fitting 378. The negative pressure caused by the vacuum draws the piston 374 toward the fitting 378, overcoming the force of the piston spring 376 and compressing the piston spring 376. With reference to FIG. 8, the translation of the piston 374 caused by the vacuum disengages or removes the shaft 426 of the piston 374 from the respective bores 212, 214, which places the lock system 136 in the unlocked state. With the lock system 136 in the unlocked state and the handle 350 in the lock position, the controller 110 outputs the one or more control signals to the isolation control unit 112 to open to enable fluid to flow to the regulator 114. The controller 110 also outputs one or more control signals to the direction control unit 116 to supply fluid to the first port 128 of the actuator 122a. The supply of fluid to the first port 128 results in the counterclockwise rotation of the inner rotor 200 and the outer rotor 202. The counterclockwise rotation of the inner rotor 200 and the outer rotor 202 rotates the ball screw 168, which translates the ball nut 170 to extend the extension shaft 172, thereby moving the thrust reverser 102 (FIG. 1) to the first, deployed position.

Based on the receipt of input to move the thrust reverser 102 from the first, deployed position to the second, stowed position, with the lock system 136 in the unlocked state and the handle 350 in the lock position, the controller 110 outputs the one or more control signals to the isolation control unit 112 to open to enable fluid to flow to the regulator 114. The controller 110 also outputs one or more control signals to the direction control unit 116 to supply fluid to the second port 134 of the actuator 122a. The supply of fluid to the second port 134 results in the clockwise rotation of the inner rotor 200 and the outer rotor 202. The clockwise rotation of the inner rotor 200 and the outer rotor 202 rotates the ball screw 168, which translates the ball nut 170 to retract the extension shaft 172, thereby moving the thrust reverser 102 (FIG. 1) to the second, stowed position. The controller 110 also outputs one or more control signals to the direction control unit 116 to supply fluid to the second port 134 of the actuator 122a to move the thrust reverser 102 (FIG. 1) from the second, stowed position to the third, overstowed position. In the third, overstowed position, the controller 110 outputs one or more control signals to the solenoid 118 to close the solenoid 118. The closing of the solenoid 118 results fluid returning to the fittings 378. With the positive fluid pressure applied to the fittings 378, the lock system 136 returns to the lock state, as discussed above.

Figure 12:
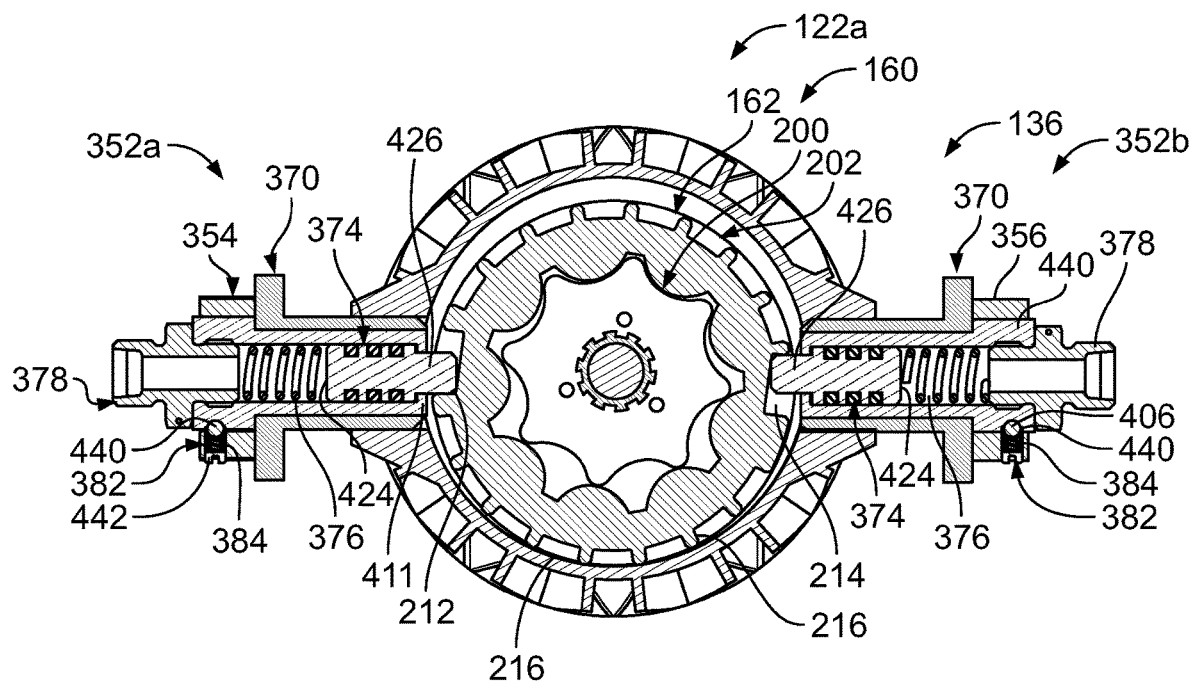
FIG. 12 is a cross-sectional view of the actuator, taken along line 11-11 of FIG. 4, which illustrates the lock system associated with the actuator in the lock state and the thrust reverser in a third, overstowed position.

In certain instances, it may be desirable to move the thrust reverser 102 (FIG. 2) to the third, overstowed position while the lock system 136 is in the lock state and the handle 350 is in the lock position. For example, it may be desirable to move the thrust reverser 102 (FIG. 2) to the third, overstowed position unlock a primary locking system associated with the thrust reverser 102. Generally, the primary locking system is unlocked in the third, overstowed position. The first overstow bore 212 and the second overstow bore 214 enable the thrust reverser 102 to move to the third, overstowed position while the lock system 136 remains in the lock state. In these instances, the controller 110 outputs the one or more control signals to the isolation control unit 112 to open to enable fluid to flow to the regulator 114. The controller 110 also outputs one or more control signals to the direction control unit 116 to supply fluid to the second port 134 of the actuator 122a. The supply of fluid to the second port 134 results in the clockwise rotation of the inner rotor 200 and the outer rotor 202. The clockwise rotation of the inner rotor 200 and the outer rotor 202 rotates the ball screw 168, which translates the ball nut 170 to further retract the extension shaft 172, to move the thrust reverser 102 (FIG. 1) to the third, overstowed position. In the third, overstowed position, with reference to FIG. 12, the elongated shape of the bores 212, 214 enables the rotation of the outer rotor 202 and the inner rotor 200 to enable the movement of the thrust reverser 102 to the third, overstowed position without requiring a movement of the lock system 136 to the unlocked state. Rather, the shaft 426 of the pistons 374 slides within the bores 212, 214 as the gerotor 162 rotates to further retract the thrust reverser 102 to the third, overstowed position.

Figure 13:
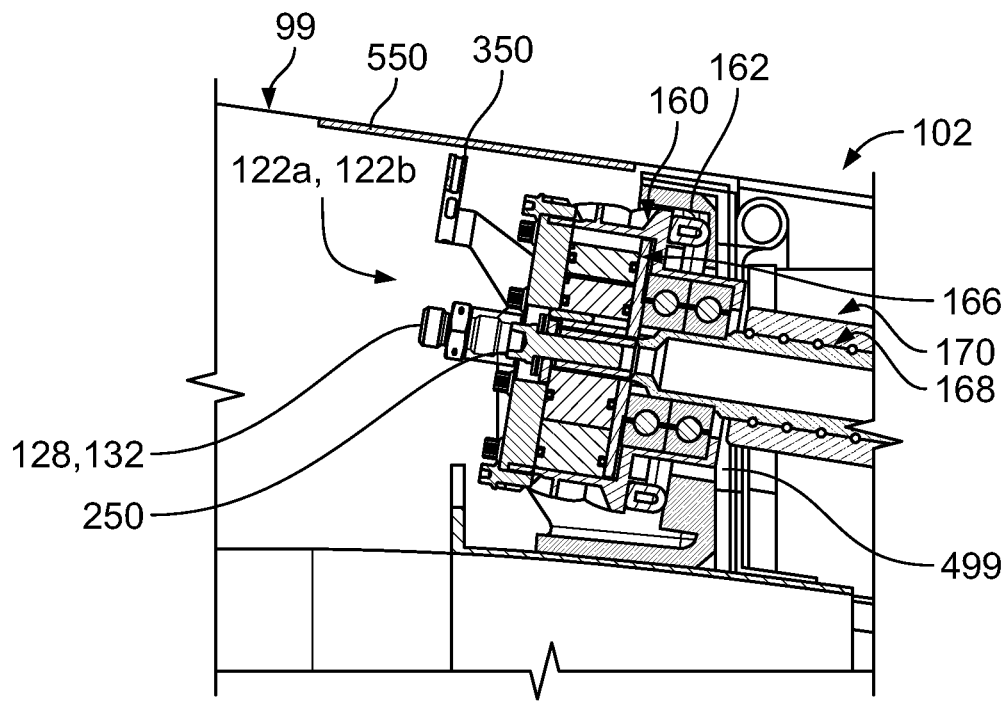
FIG. 13 is a cross-sectional view of the actuator, taken along line 13-13 of FIG. 1, which illustrates the handle of the lock system in the lock position.
Figure 14:
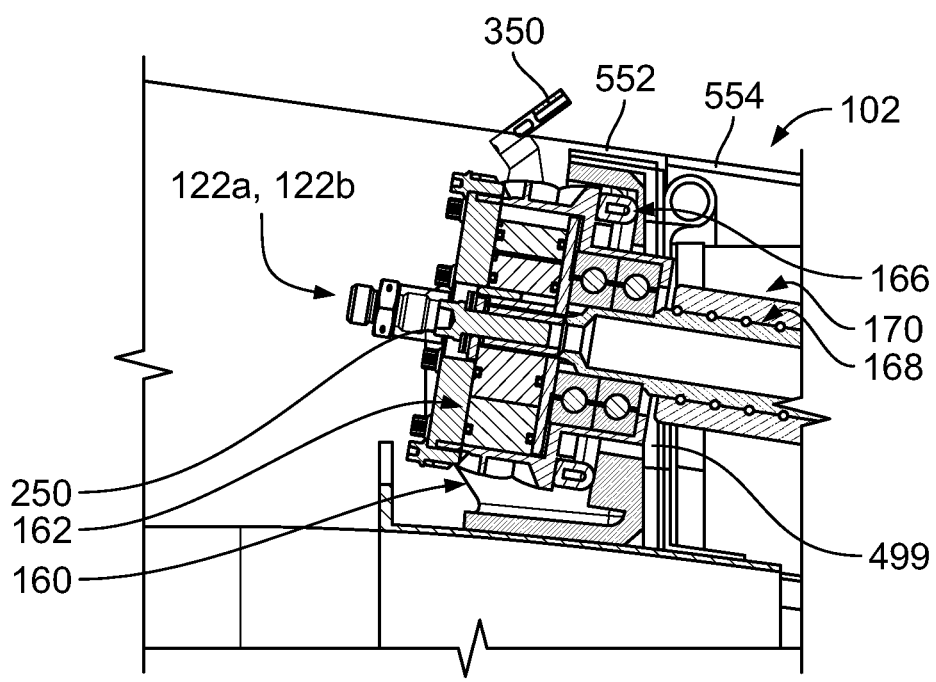
FIG. 14 is a cross-sectional view of the actuator, taken along line 13-13 of FIG. 1, which illustrates the handle of the lock system in the unlocked position.
Figure 15:
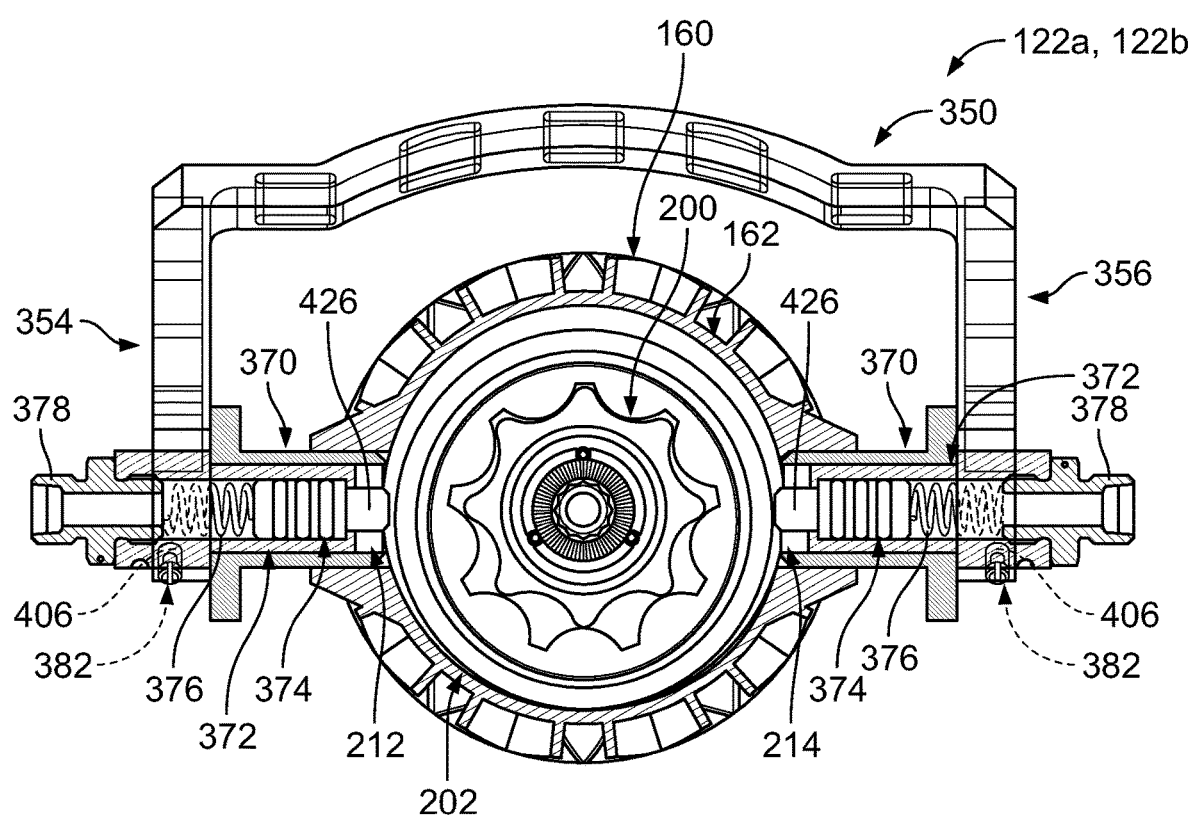
FIG. 15 is a cross-sectional view of the actuator, taken along line 11-11 of FIG. 4, which illustrates the lock system associated with the actuator in the unlocked state and the handle in the unlocked position.

With reference to FIG. 13, when the actuators 122a, 122b are coupled to the thrust reverser 102 and the handle 350 is in the locked position, the handle 350 is stowed beneath or is not in contact with an access panel 550 disposed outboard of the actuators 122a, 122b. The access panel 550 inhibits the movement of the handle 350 from the lock position to the unlocked position. Stated another way, due to the shape of the detent groove 406 (FIG. 9) the handle 350 rotates upward to move from the lock position to the unlock position, which interferes with the access panel 550. In certain instances, for maintenance, for example, the technician may need to manually actuate the actuators 122a, 122b to move the thrust reverser 102 to the first, deployed position. In these instances, the technician removes the access panel 550. With the access panel 550 removed, with reference to FIG. 14, the technician grasps the handle 350 and moves the handle 350 from the lock position to the unlocked position along the arc defined by the detent groove 406 (FIG. 9), which causes the handle 350 to extend through an opening 552 covered by the access panel 550 (FIG. 13) and beyond an external surface 554 of the thrust reverser 102. With reference to FIG. 15, the movement of the handle 350 within the detent groove 406 to the unlocked position moves the piston housings 372 outboard or away from the gerotor 162. Since the pistons 374 are each coupled to the respective piston housing 372, the outboard movement of the piston housings 372 retracts or disengages the shaft 426 of the pistons 374 with the bores 212, 214. With the pistons 374 disengaged with the bores 212, 214, the lock system 136 is in the unlocked state even with positive fluid pressure contained within the fluid cavity defined between the respective head 424 and the fitting 378. With the lock system 136 in the unlocked state, a tool, such as a socket head, ratchet, etc. is coupled to the mechanical fastener 250 and is rotated clockwise or counterclockwise to turn the mechanical fastener 250, and thus, the ball screw 168 in the clockwise or clockwise direction. Once the manual movement of the thrust reverser 102 is completed, the technician moves the handle 350 to the locked position. As the bores 212, 214, 216 are defined about the perimeter of the outer rotor 202, the lock system 136 is movable to the lock state by the handle 350 regardless of the position of the outer rotor 202. Thus, the bores 212, 214, 216 enable the lock system 136 to be placed in the lock state at different intervals of extensions of the extension shaft 172 between the third, overstowed position and the first, deployed position in the instances where the handle 350 is rotated back to the lock position at some state of deployment. The handle 350 must be returned to the lock position to replace the access panel 550 (FIG. 14) prior to flight of the vehicle 99 (FIG. 1).

It should be noted that in other embodiments, the actuator system 100 may be configured differently to move the thrust reverser 102 (FIG. 2). For example, with reference to FIG. 16, an actuator system 600 is shown. As the actuator system 600 includes components that are the same or similar to components of the actuator system 100 discussed with regard to FIGS. 1-15, the same reference numerals will be used to denote the same or similar components. The actuator system 100 includes the controller 110 (FIG. 3), the isolation control unit 112 (FIG. 3), the regulator 114 (FIG. 3), the direction control unit 116 (FIG. 3), the solenoid 118 (FIG. 3), the pump 120, a driven actuator 602, a driving actuator system 604 and a flexshaft 606. In this example, the driven actuator 602 is mounted at the first end or upper end 102a of the thrust reverser 102, and the driving actuator system 604 is mounted at the second end or lower end 102b of the thrust reverser 102. The driven actuator 602 and the driving actuator system 604 are coupled to the thrust reverser 102 using the mounting brackets 138. The driven actuator 602 comprises any suitable actuator capable of being driven by the flexshaft 606, including, but not limited to the actuator system 210 of commonly assigned U.S. Publication No. 2003/0066284 to Chakkera et al., titled "Thrust Reverser Actuator with An Automatic Relock and Lock Drop Prevention Mechanism" filed on Sep. 7, 2001, the relevant portion of which is incorporated herein by reference. The flexshaft 606 is any suitable flexible shaft for transferring torque from the driving actuator system 604 to the driven actuator 602. The flexshaft 606 may include a plurality of gear teeth 606a at each end of the flexshaft 606, such as bevel gear teeth, etc. to assist in coupling the flexshaft 606 to the driven actuator 602 and the driving actuator system 604. In this example, the plurality of gear teeth 606a comprise bevel gear teeth, however, other tooth configurations may be employed.

Figure 17:
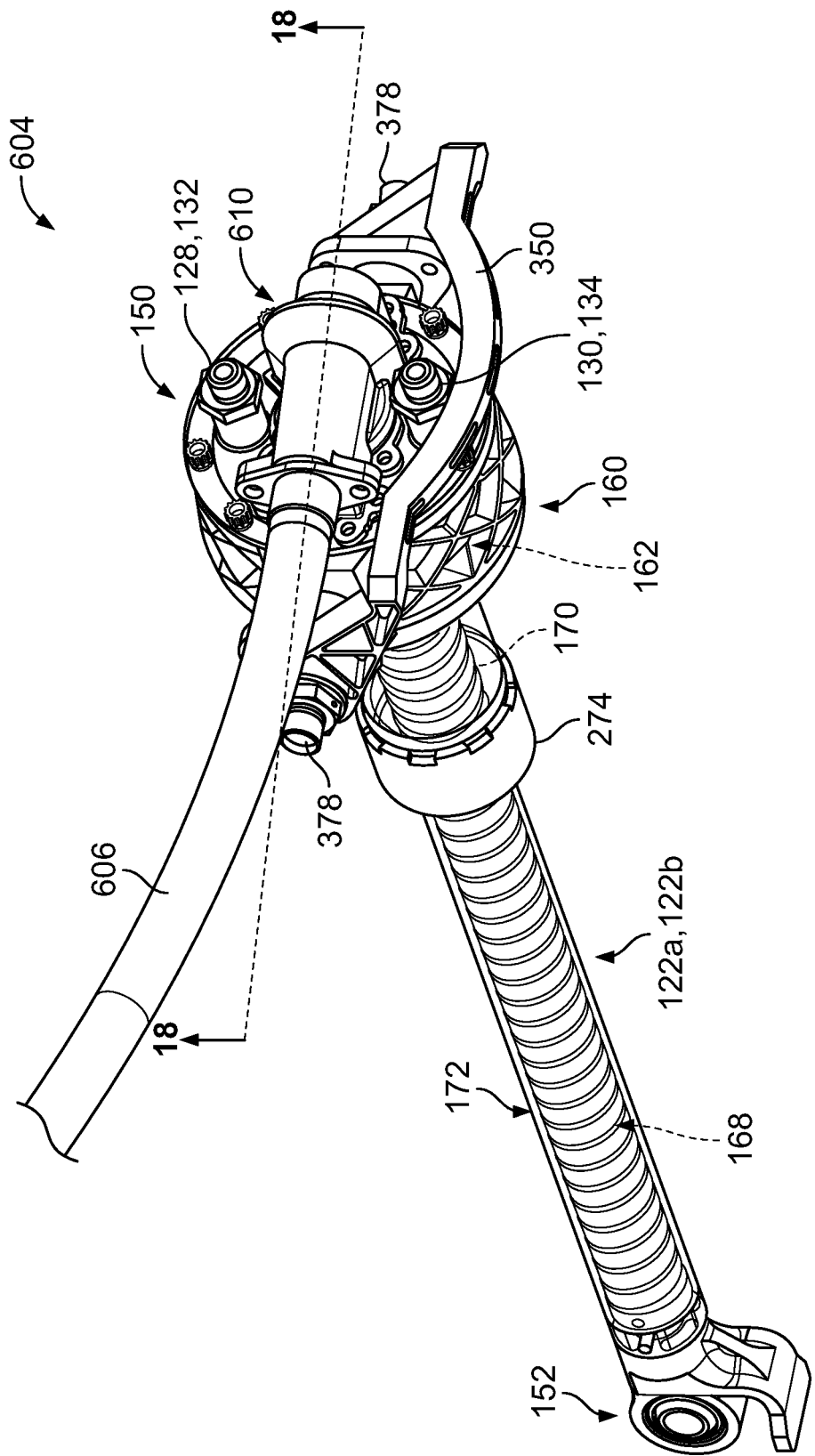
FIG. 17 is a perspective view of an actuator coupled to a flexible shaft or flexshaft of the actuator system of FIG. 16.
Figure 18:
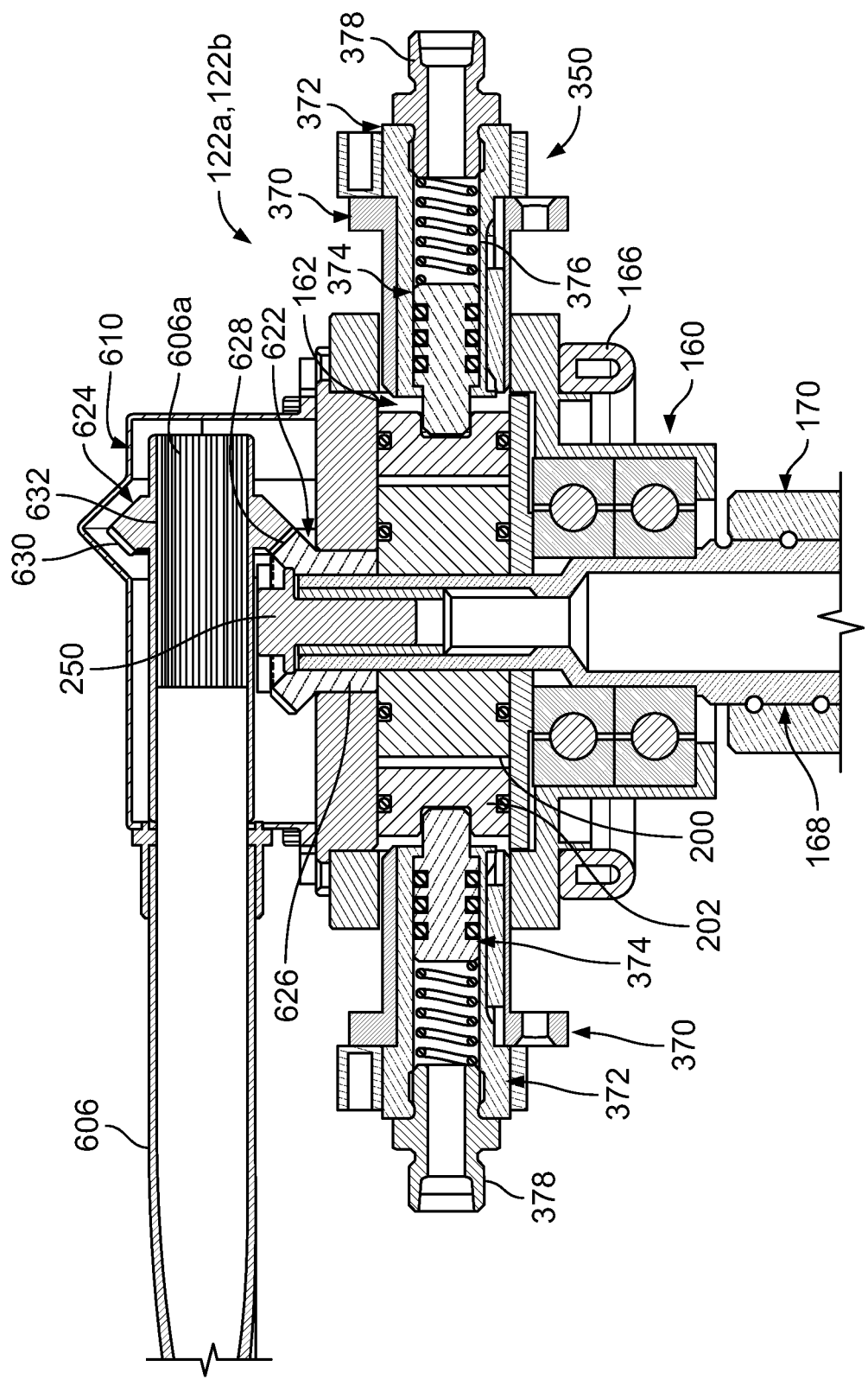
FIG. 18 is a cross-sectional view of the actuator of FIG. 17, taken along line 18-18 of FIG. 17.

In this example, the driving actuator system 604 includes one of the actuators 122a, 122b and a bevel gear drive system 610. The bevel gear drive system 610 is coupled to the flexshaft 606. The flexshaft 606 transmits the torque from the actuator 122a, 122b to the driven actuator 602. With reference to FIG. 17, the driving actuator system 604 is shown in greater detail. In the example of FIG. 17, the first ports 128, 132 and the second ports 130, 134 are rotated about 90 degrees to facilitate the coupling of the bevel gear drive system 610 to the actuator 122a, 122b. The bevel gear drive system 610 is coupled to the actuator 122a, 122b at the first actuator end 150. In one example, the bevel gear drive system 610 includes a bevel housing 620 and a bevel gear set including a first bevel gear 622 and a second bevel gear 624. The bevel housing 620 substantially encloses the first bevel gear 622 and the second bevel gear 624. The bevel housing 620 is coupled to the gerotor housing 160 at the first actuator end 150. The first bevel gear 622 is disposed about the mechanical fastener 250, and is coupled to the inner rotor 200 and the ball screw 168 to rotate with the inner rotor 200 and the ball screw 168 as the inner rotor 200 and the ball screw 168 rotate. The first bevel gear 622 includes a hub 626 and a plurality of gear teeth 628. The hub 626 is coupled to the inner rotor 200 and the ball screw 168 via welding, for example. The plurality of gear teeth 628 are defined at a distal end of the first bevel gear 622 and comprise a plurality of bevel gear teeth, however, other tooth configurations may be employed. The plurality of gear teeth 628 of the first bevel gear 622 engage a plurality of gear teeth 630 of the second bevel gear 624.

The second bevel gear 624 includes the plurality of gear teeth 630, which are defined about an outer perimeter or circumference of the second bevel gear 624. In one example, the second bevel gear 624 is hollow, and a plurality of second gear teeth 632 are defined about the inner perimeter or circumference of the second bevel gear 624. In this example, each of the plurality of gear teeth 630, 632 are bevel gear teeth, however, other tooth configurations may be employed. The plurality of second gear teeth 632 engage with the gear teeth 606a of the flexshaft 606. The second bevel gear 624 is coupled to and meshes with the first bevel gear 622 and the flexshaft 606.

Generally, as the assembly and installation of the actuator system 600 is substantially the same as the assembly and installation of the actuator system 100, the differences will be discussed herein. Briefly, once the actuator 122a, 122b is coupled to the thrust reverser 102, the first bevel gear 622 is coupled to the inner rotor 200 and the ball screw 168. The second bevel gear 624 is coupled to the first bevel gear 622. The flexshaft 606 is coupled to the second bevel gear 624 and the bevel housing 620 is positioned about the bevel gear drive system 610. The flexshaft 606 is coupled to the driven actuator 602.

Figure 16:
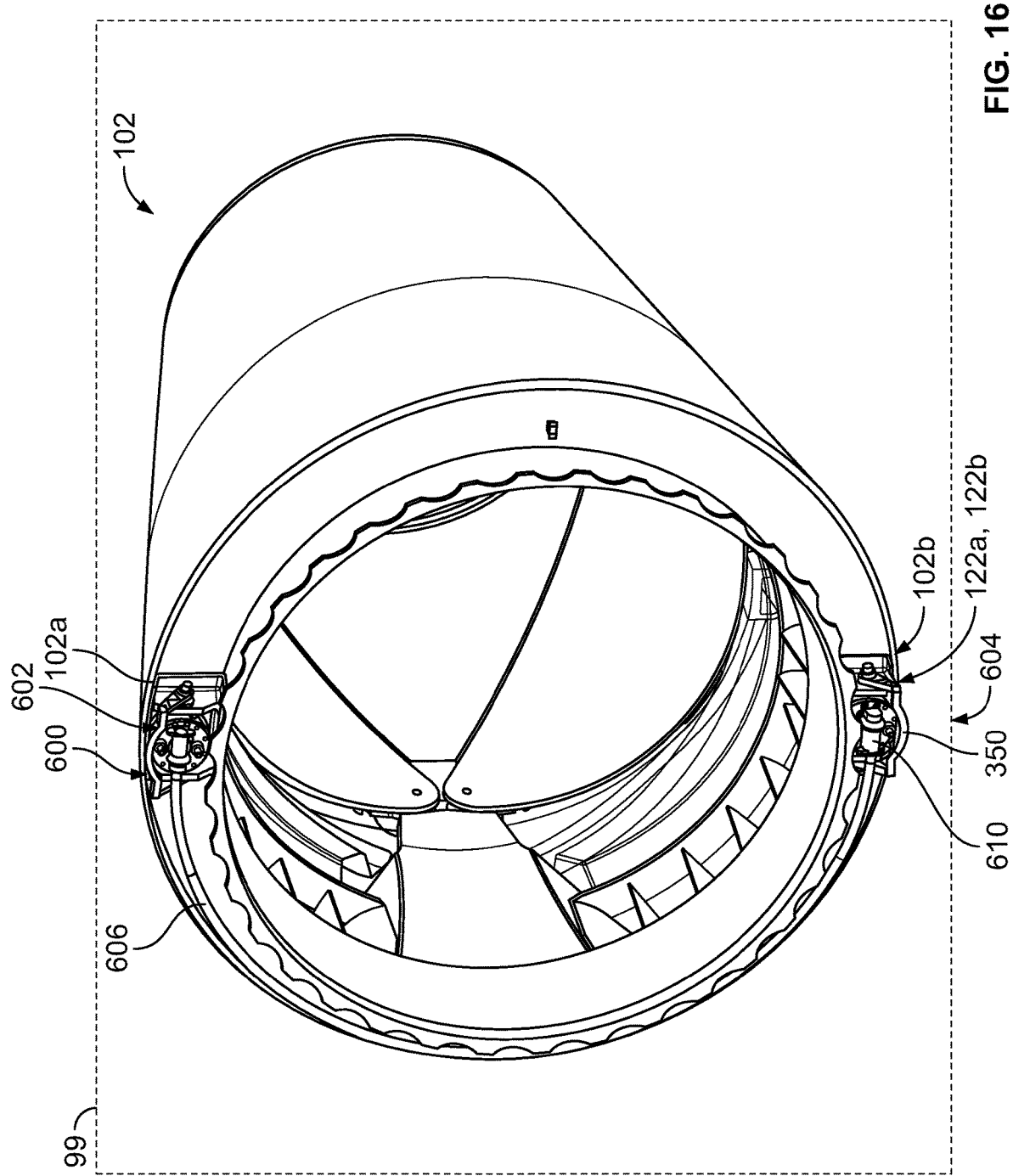
FIG. 16 is a perspective view of another exemplary actuator system for a thrust reverser in accordance with various embodiments.

As the actuator system 600 operates substantially the same as the actuator system 100, the differences will be discussed herein. Briefly, as the gerotor 162 rotates the ball screw 168 clockwise or counterclockwise, the first bevel gear 622 rotates the second bevel gear 624 clockwise or counterclockwise, respectively. The rotation of the second bevel gear 624, in turn, rotates the flexshaft 606 clockwise or counterclockwise. The clockwise or counterclockwise rotation of the flexshaft 606 drives the driven actuator 602 clockwise or counterclockwise, respectively, which cooperates with the movement of the actuator 122a, 122b to move the thrust reverser 102 (FIG. 16).

Thus, the actuator system 100, 600 enables the movement of the thrust reverser 102 (FIG. 2) without requiring an additional motor to be mounted external from the thrust reverser 102 (FIG. 2). By eliminating the additional motor, a weight of the actuator system 100, 600 is reduced, which in turn, reduces a weight of the thrust reverser 102. In addition, the use of the lock system 136 ensures that the actuators 122a, 122b are locked during flight as the handle 350 interferes with the coupling of the access panel 550 (FIG. 13) to the opening 552 (FIG. 14). Further, the use of the lock system 136, with the handle 350, enables the technician to manually operate the actuators 122a, 122b to move the thrust reverser 102 without requiring the disconnection of the hydraulic system, which reduces service time. In addition, this movement of the actuators 122a, 122b may be performed when the gas turbine engine 108 is off. In other words, the movement of the actuators 122a, 122b does not require electrical or hydraulic power to stow or deploy the thrust reverser 102. This may be beneficial during maintenance of the thrust reverser 102 or if there may be an issue with the thrust reverser 102 requiring inspection or maintenance when the gas turbine engine 108 is off. This also provides safety to the technicians, the thrust reverser 102, and the actuators 122a, 122b, when the thrust reverser 102 may need components replaced that are used during the movement of the thrust reverser 102 between the first deployed position and/or the second, stowed position. The use of the lock bores 216 defined on the outer rotor 202 of the gerotor 162 also enable the thrust reverser 102 to be locked at any position between the second, stowed position and the first, deployed position for safety during maintenance procedures. This prevents inadvertent motion of a partially or fully deployed thrust reverser 102 if technicians are working around the thrust reverser 102 area.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An actuator for a thrust reverser, comprising:
   a ball screw configured to be coupled to the thrust reverser;
   a ball nut coupled to the ball screw;
   a gerotor coupled to the ball screw, the gerotor including an inner rotor coupled to the ball screw and an outer rotor, a movement of the inner rotor relative to the outer rotor is configured to rotate the ball screw relative to the ball nut to move the thrust reverser between at least a first position and a second position, and the outer rotor includes a plurality of bores spaced apart about a perimeter of the outer rotor; and
   a lock system coupled to the outer rotor and movable between an unlocked state and a lock state, the lock system configured to enable the gerotor to rotate the ball screw in the unlocked state and to inhibit a rotation of the ball screw in the lock state, the lock system including a piston coupled to a piston housing and a grippable member coupled to the piston housing, the piston is received in one of the plurality of bores of the outer rotor in the lock state, and the grippable member is configured to move the piston housing relative to the gerotor to move the lock system to the unlocked state.

2. The actuator of claim 1, further comprising a gerotor housing, the gerotor is disposed within the gerotor housing and the gerotor housing includes a lock receiving bore.

3. The actuator of claim 2, wherein the lock system further comprises a trunnion, and the trunnion is coupled to the lock receiving bore and the piston housing.

4. The actuator of claim 3, wherein the trunnion defines a central trunnion bore that receives the piston housing, the central trunnion bore defines a trunnion key slot, the piston housing defines a housing key slot, and the trunnion key slot and the housing key slot cooperate to receive a key to inhibit a rotation of the piston housing relative to the trunnion.

5. The actuator of claim 1, wherein the piston housing defines a detent groove along an exterior surface of the piston housing, and the grippable member includes a detent pin that is received within the detent groove.

6. The actuator of claim 1, wherein the piston housing includes a piston spring and a fitting, the piston includes a head and a shaft, the shaft is configured to engage the one of the plurality of bores of the outer rotor and the piston spring is disposed between the head and the fitting to bias the piston into engagement with the one of the plurality of bores of the outer rotor.

7. The actuator of claim 1, wherein the plurality of bores of the outer rotor includes a pair of overstow bores, which have a dimension that is different than a remainder of the plurality of bores.

8. The actuator of claim 1, further comprising an extension shaft coupled to the ball nut and configured to be coupled to the thrust reverser, the ball screw is received within the extension shaft, and the rotation of the ball screw is configured to translate the ball nut to move the extension shaft.

9. The actuator of claim 8, wherein an end of the actuator opposite the gerotor includes a coupling portion coupled to the extension shaft with a pin and an attachment portion, and the coupling portion and the attachment portion are configured to couple the actuator to the thrust reverser.

10. The actuator of claim 8, wherein an end of the actuator opposite the gerotor includes a coupling portion and an attachment portion, the coupling portion coupled to the extension shaft with a connecting shaft, and the coupling portion and the attachment portion are configured to couple the actuator to the thrust reverser.

11. The actuator of claim 1, further comprising a bevel gear set coupled to at least one of the ball screw and the inner rotor for rotation with the ball screw in the unlocked state.

12. The actuator of claim 11, wherein the actuator is a first actuator, and further comprising a second actuator configured to be coupled to the thrust reverser, a flex shaft coupled to the bevel gear set and the second actuator, and the flex shaft is configured to be driven by the bevel gear set to drive the second actuator.

13. An actuator system for a thrust reverser, comprising:
a source of a fluid;
a lock system in fluid communication with the source of the fluid and movable between an unlocked state and a lock state, the lock system including a piston coupled to a piston housing and a grippable member coupled to the piston housing, the piston movable based on a pressure of the fluid to move the lock system between the unlocked state and the lock state, and the grippable member is configured to move the piston housing relative to a gerotor to move the lock system to the unlocked state; and
an actuator including a ball screw configured to be coupled to the thrust reverser, the gerotor having an inner rotor and an outer rotor, the outer rotor including at least one bore configured to receive the piston in the lock state, the ball screw coupled to the inner rotor and to a ball nut, and the gerotor is configured to rotate the ball screw relative to the ball nut to move the thrust reverser between at least a first position and a second position in the unlocked state.

14. The actuator system of claim 13, further comprising a bevel gear set coupled to at least one of the ball screw and the inner rotor for rotation with the ball screw in the unlocked state.

15. The actuator system of claim 14, wherein the actuator is a first actuator, and further comprising a second actuator configured to be coupled to the thrust reverser, a flex shaft coupled to the bevel gear set and the second actuator, and the flex shaft is configured to be driven by the bevel gear set to drive the second actuator.

16. The actuator system of claim 13, wherein the gerotor is in fluid communication with the source of the fluid and is responsive to the fluid to rotate the ball screw relative to the ball nut in the unlocked state.

17. The actuator system of claim 16, wherein the actuator is a first actuator, and further comprising a second actuator configured to be coupled to the thrust reverser, the first actuator having a first port and a second port, the second actuator having a third port and a fourth port, the first port and the fourth port in selective fluid communication with the source of the fluid and the second port is fluidly coupled to the third port such that the fluid received to the first port is configured to flow to the second actuator or the fluid received to the fourth port is configured to flow to the second port of the first actuator.

18. The actuator system of claim 13, wherein the piston housing defines a detent groove along an exterior surface of the piston housing, and the grippable member includes a detent pin that is received within the detent groove.

19. The actuator system of claim 13, wherein the at least one bore of the outer rotor comprises a plurality of bores, and the plurality of bores includes a pair of overstow bores that have a dimension that is different than a remainder of the plurality of bores.

20. The actuator system of claim 13, further comprising a gerotor housing, the gerotor is disposed within the gerotor housing, the gerotor housing includes a lock receiving bore, the lock system further comprises a trunnion coupled to the lock receiving bore and the piston housing, the trunnion defines a central trunnion bore that receives the piston housing, the central trunnion bore defines a trunnion key slot, the piston housing defines a housing key slot, and the trunnion key slot and the housing key slot cooperate to receive a key to inhibit a rotation of the piston housing relative to the trunnion.

* * * * *